(12) United States Patent
Kikuchi et al.

(10) Patent No.: US 10,666,851 B2
(45) Date of Patent: May 26, 2020

(54) IMAGING DEVICE AND FOCUS ADJUSTMENT METHOD USING AN INDEX REPRESENTING BOKEH STATE

(71) Applicant: Olympus Corporation, Hachioji-shi, Tokyo (JP)

(72) Inventors: Tetsuo Kikuchi, Hachioji (JP); Tetsuya Toyoda, Hachioji (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 16/432,738

(22) Filed: Jun. 5, 2019

(65) Prior Publication Data

US 2019/0387175 A1 Dec. 19, 2019

(30) Foreign Application Priority Data

Jun. 14, 2018 (JP) .................................. 2018-113754

(51) Int. Cl.
*H04N 5/232* (2006.01)
*G03B 13/36* (2006.01)
*H04N 5/369* (2011.01)

(52) U.S. Cl.
CPC ....... *H04N 5/232122* (2018.08); *G03B 13/36* (2013.01); *H04N 5/232125* (2018.08); *H04N 5/36961* (2018.08)

(58) Field of Classification Search
CPC ......... H04N 5/232122; H04N 5/36961; H04N 5/232125; H04N 5/23212; G03B 13/36
See application file for complete search history.

(56) References Cited

U.S. PATENT DOCUMENTS

| | | | |
|---|---|---|---|
| 2015/0234865 A1* | 8/2015 | Iida | G06F 16/5866 348/349 |
| 2016/0373642 A1 | 12/2016 | Ito | |
| 2019/0141254 A1* | 5/2019 | Kawarada | H04N 5/23245 |
| 2019/0302399 A1* | 10/2019 | Nakamura | G02B 15/16 |

FOREIGN PATENT DOCUMENTS

JP 07-038798 2/1995

* cited by examiner

*Primary Examiner* — Nicholas G Giles
(74) *Attorney, Agent, or Firm* — John C. Pokotylo; Pokotylo Patent Services

(57) ABSTRACT

An imaging device, comprising an image sensor that receives subject light and generates image data, and a processor comprising a focus control section, an index generating section, and a control section, wherein the focus control section performs focus detection based on the image data, and controls focus drive based on focus detection results, the index generating section is input with the image data, and generates a first index representing which image of a given plurality of types of image the image data is close to, and a second index representing Bokeh state of an image corresponding to the image data, and the control section changes control of focus drive by the focus control section based on output of the index generating section.

20 Claims, 13 Drawing Sheets

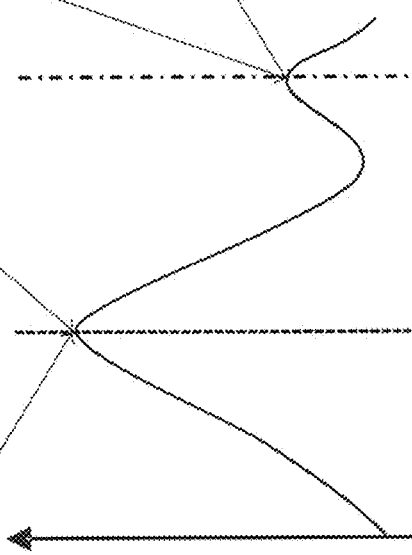
FIG. 5

FIG. 6
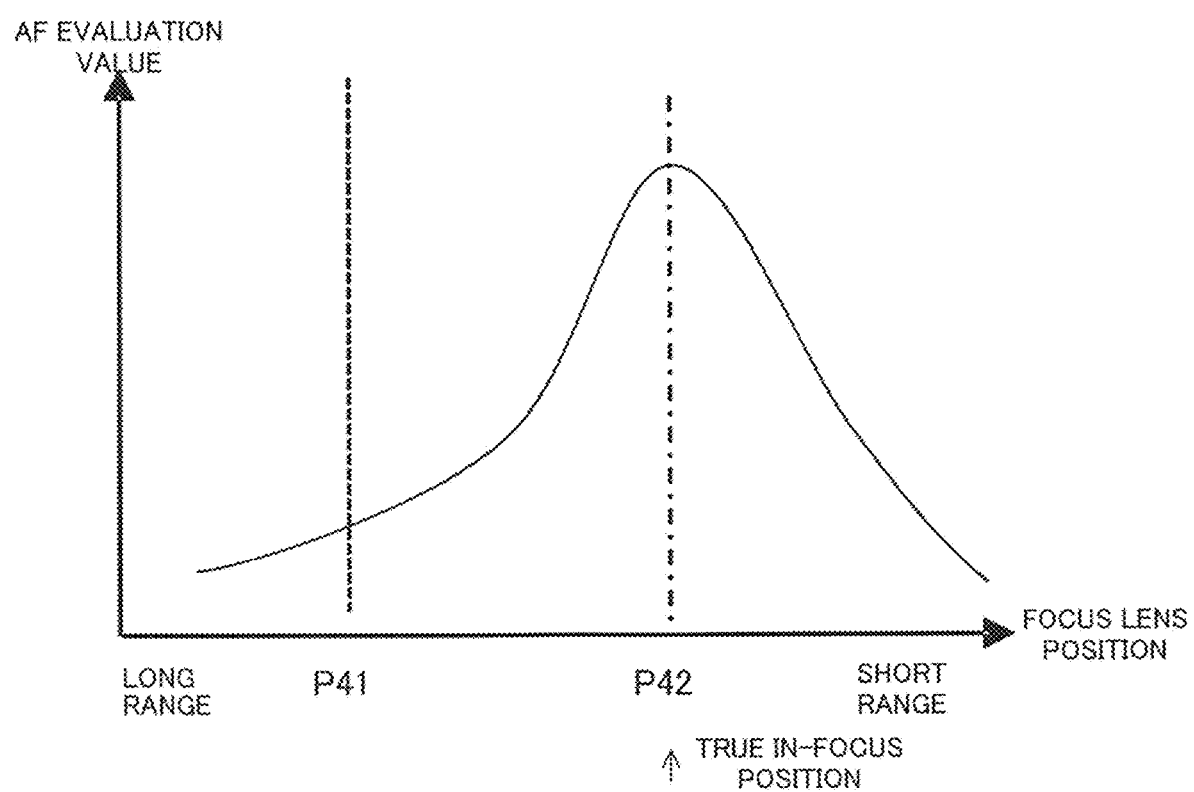

| NN FOR SCENE DETERMINATION | SHOOTING STANDBY IN PROGRESS | STILL PICTURE AF FOCUS DETERMINATION TIME POINT | MOVIE AF OPERATION IN PROGRESS |
|---|---|---|---|
| | ENTIRE SCREEN/ DIVIDED AREA | | ENTIRE SCREEN/ DIVIDED AREA |
| NN FOR FOCUS STATE DETERMINATION | CONFORMITY TO USER SETTINGS | 1 AREA (SELECTION AREA) | CONFORMITY TO USER SETTINGS |

FIG. 11

| SCENE DETERMINATION RESULT | NN USED AT THE TIME OF STILL PICTURE AF FOCUS DETERMINATION |
|---|---|
| MIX OF NEAR AND FAR OBJECTS | NN THAT HAS LEARNED FOCUS/NON-FOCUS CLOSE TO MAIN SUBJECT OF MIX OF NEAR AND FAR OBJECTS SCENE |
| NIGHT SCENE | NN THAT HAS LEARNED FOCUS/NON-FOCUS CLOSE TO MAIN SUBJECT OF NIGHT SCENE |
| PERIODICITY | NN THAT HAS LEARNED FOCUS/NON-FOCUS CLOSE TO MAIN SUBJECT OF PERIODICITY SCENE |
| GENERAL SCENE | NN THAT HAS LEARNED FOCUS/NON-FOCUS CLOSE TO MAIN SUBJECT OF NIGHT SCENE |

IMAGING DEVICE AND FOCUS ADJUSTMENT METHOD USING AN INDEX REPRESENTING BOKEH STATE

CROSS-REFERENCE TO RELATED APPLICATIONS

Benefit is claimed, under 35 U.S.C. § 119, to the filing date of prior Japanese Patent Application No. 2018-113754 filed on Jun. 14, 2018. This application is expressly incorporated herein by reference. The scope of the present invention is not limited to any requirements of the specific embodiments described in the application.

BACKGROUND OF THE INVENTION

1. Field of the Invention

The present invention relates to an imaging device and focus adjustment method that perform focus adjustment of a lens based on an image signal from an image sensor.

2. Description of the Related Art

As a method for automatic focus detection for a photographing lens provided in an imaging device, a phase difference detection method and a contrast AF method have been used. Contrast AF is a method that calculates a contrast value (also called an AF evaluation value) for a subject image that has been formed by a photographing lens, and controls position of the photographing lens so that this contrast value becomes a peak value.

However, with a contrast AF method it is difficult to perform focus detection accurately for a subject such as a point light source at the time of shooting a night scene. Specifically, in a night scene, such as where illuminations and car headlights are included as a subject, in a case where a focal position of the photographing lens gives a significant Bokeh state a point light source becomes a circular shape, but edges of the Bokeh of this circular shape appear distinct, and it is easy for false focus to occur. A focus detection device has therefore been proposed that prevents the occurrence of false focus by processing an AF evaluation value (refer to Japanese patent laid-open No. 2017-009752 (hereafter referred to as "patent publication 1")). An auto-focus device has also been proposed that inputs AF evaluation value change amount and focus lens position to a neural network, so as to detect a direction for in-focus position (refer to Japanese patent laid-open No. Hei. 7-038798 (hereafter referred to as "patent publication 2")).

In the case of a subject that is a night scene, the focus detection device that was disclosed in patent publication 1 described above can prevent false focus. However, even if it is not a difficult to handle scene such as a night scene it is not possible to prevent false focus if correction processing (processing disclosed in patent publication 1, for example) is executed to deal with the difficult to handle scene, and there may be cases where focusing is not possible. Also, with the auto-focus device disclosed in patent publication 2 subject position is predicted, AF control is switched, and it is not possible to focus with various difficult to handle scenes.

SUMMARY OF THE INVENTION

The present invention provides an imaging device and focus adjustment method that prevent wasteful AF operation without resulting in false focus or non-focus, even for a subject in various difficult to handle scene.

An imaging device of a first aspect of the present invention comprises an image sensor that receives subject light and generates image data, and a processor comprising a focus control section, an index generating section and a control section, wherein the focus control section performs focus detection based on the image data, and controls focus drive based on focus detection results, the index generating section is input with the image data, and generates a first index representing which image of a given plurality of types of image the image data is close to, and a second index representing Bokeh state of an image corresponding to the image data, and the control section changes control of focus drive by the focus control section based on output of the index generating section.

A focus adjustment method of a second aspect of the present invention comprises receiving subject light using an image sensor and generating image data, inputting the image data, and generating a first index representing which image of a given plurality of types of image the image data is close to, and a second index representing Bokeh state of an image corresponding to the image data, and performing focus detection based on the image data, and, when controlling a focus operation based on focus detection results, changing control of the focus drive based on the first index and the second index.

A non-transitory computer-readable medium of a third aspect of the present invention, storing a processor executable code, which when executed by at least one processor, performs a focus adjusting method, the focus adjusting method comprising receiving subject light using an image sensor and generating image data, inputting the image data, and generating a first index representing which image of a given plurality of types of image the image data is close to, and a second index representing Bokeh state of an image corresponding to the image data, and performing focus detection based on the image data, and, when controlling a focus operation based on focus detection results, changing the focus drive control based on the first index and the second index.

BRIEF DESCRIPTION OF THE DRAWINGS

FIG. 5 is a drawing for describing AF control in a case where there is a mix of near and far subjects, in the camera of one embodiment of the present invention.

FIG. 6 is a drawing for describing AF control in a case where there is a general scene, in the camera of one embodiment of the present invention.

FIG. 11 is a table showing a relationship between scene judgment results and a neural network (NN) used in focus judgment at the time of still picture shooting, in the camera of one embodiment of the present invention.

DETAILED DESCRIPTION OF THE PREFERRED EMBODIMENTS

An example where a digital camera (hereafter simply called "camera") is adopted as one embodiment of an imaging device of the present invention will be described in the following. The imaging device includes various imaging devices having a focus lens, besides devices such as a digital camera and a smartphone. The camera of this embodiment has an imaging section, with a subject image being converted to image data by this imaging section, and the subject image being subjected to live view display on a display section arranged on the rear surface of a main body based on this converted image data. A photographer determines composition and photo opportunity by looking at the live view display. If a release button is operated at the time of still picture shooting, image data for a still picture is stored in a storage medium. Image data that has been stored in the storage medium can be subjected to playback display on the display section if playback mode is selected. Image data of a movie is also stored in the storage medium if a movie button etc. is operated at the time of movie shooting. Image data that has been stored in the storage medium can be subjected to playback display on the display section if playback mode is selected.

Also, this camera has a neural network, with learning results for classifying subject scenes and learning results for judging Bokeh state of an image (focus, non focus etc.) being set in this neural network. The camera inputs image data from the imaging section to the neural network, performs subject scene classification, and determines Bokeh state and focused state of an image.

Figure 1:
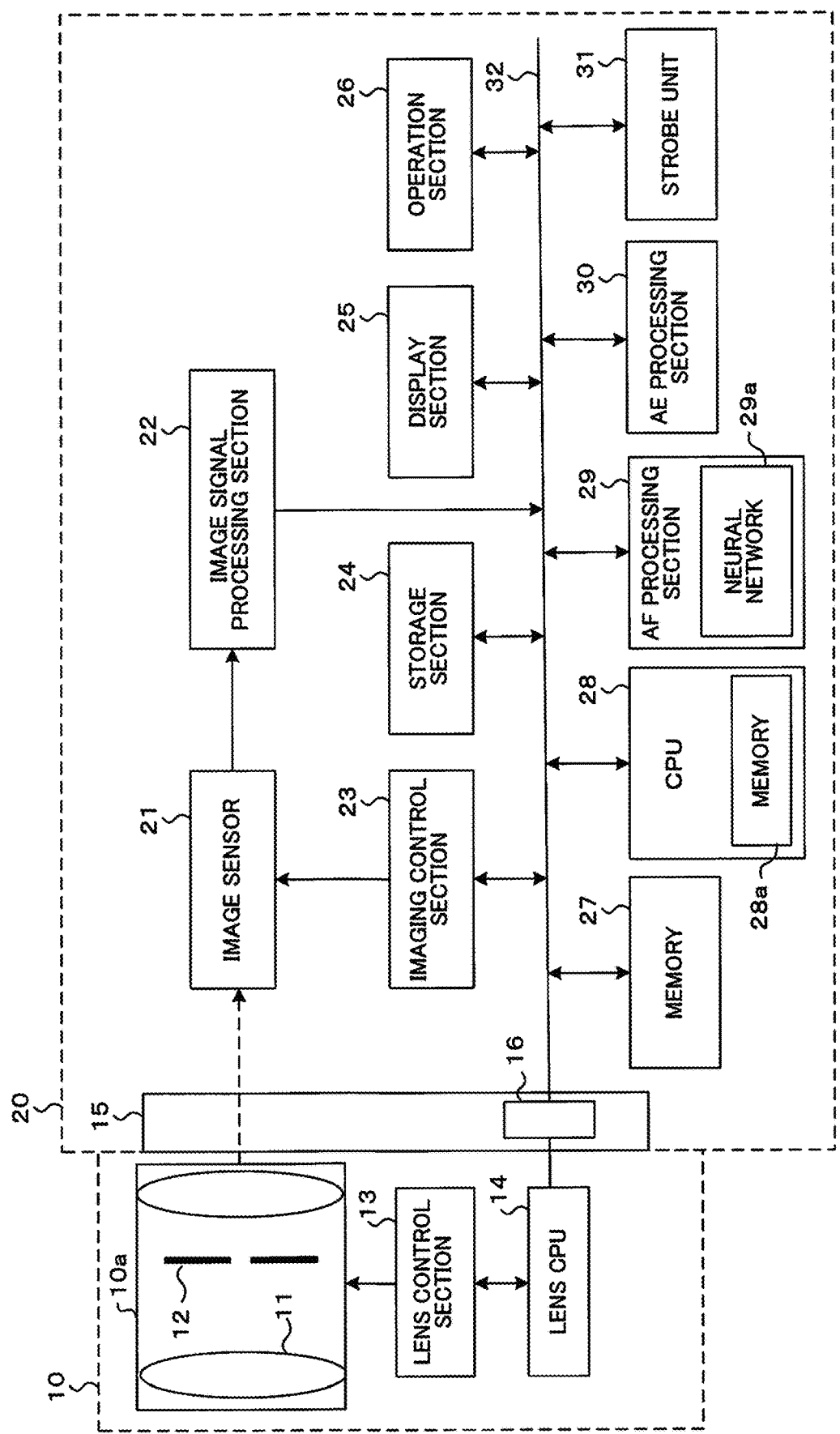
FIG. 1 is a block diagram mainly showing the electrical structure of a camera of one embodiment of the present invention.

FIG. 1 is a block diagram mainly showing the electrical structure of the camera of this embodiment. This camera comprises an interchangeable lens 10 and a camera body 20. The interchangeable lens 10 and the camera body 20 are electrically connected by means of an electrical signal connection point 16 that is provided on a mount section 15 of the camera body 20. It should be noted that the interchangeable lens 10 and the camera body 20 may also have an integrated structure. In this case, functions of a lens CPU (Central Processing Unit) within the interchangeable lens 10 may be handled by a CPU within the camera body 20.

The interchangeable lens 10 has a lens section 10a, a lens control section 13, and a lens CPU 14. Also, although omitted from the drawings, the interchangeable lens 10 has a storage section (memory). This storage section stored lens information, and this lens information is information relating to the lens section 10a. This storage section also stores programs and parameters etc. required in operation of the interchangeable lens 10. This storage section may be provided within the lens CPU 14, for example. Obviously the storage section may also be provided separately from the lens CPU 14, and in this case the storage section and the lens CPU 14 are connected.

Also, each block of the interchangeable lens 10 is configured using hardware, for example. However, some blocks do not have to be configured using hardware, and may be configured using software. Also, each block of the interchangeable lens 10 need not be configured using a single hardware or software component, and may be configured using a plurality of hardware or software components.

The lens section 10a includes an optical system for forming light flux from a subject into an image on the image sensor 21 of the camera body 20. The lens section 10a has a single lens or a plurality of lenses, including a focus lens 11, and an aperture 12. Here, the optical system of the lens section 10a may be configured as a zoom lens. The aperture 12 is constructed with a variable diameter, and restricts light flux from the subject that is incident on the image sensor 21. By changing the diameter of the aperture 12 it is possible to control large amount that is incident on the image sensor 21.

The lens control section 13 includes an actuator such as a motor for driving the focus lens 11 and the aperture 12, and a drive control circuit performing control of that actuator. Based on control signals from the lens CPU 14, the lens control section 13 performs focus adjustment by driving the focus lens 11 of the lens section 10a in the optical axis direction. Also, the lens control section 13 controls aperture value by driving the aperture 12 based on a control signal from the lens CPU 14.

The lens CPU 14 is a processor for lens control, and has a CPU (Central Processing Unit) and peripheral circuits. As described previously, there may also be a memory for storing programs and/or parameters etc. The lens CPU 14 communicates with a CPU 28 of the camera body 20 by means of the electrical signal connection point 16. The lens CPU 14 performs control of the lens control section 13 under the control of the CPU 28. The lens CPU 14 does not always need to be a CPU, and may also be configured using an ASIC (Application Specific Integrated Circuit) or FPGA (Field-Programmable Gate Array) etc.

The camera body 20 comprises the image sensor 21, image signal processing section 22, imaging control section 23, storage section 24, display section 25, operation section 26, memory 27, CPU 28, AF processing section 29, AE processing section 30, strobe unit 31, and bus 32. Also, as will be described later, the camera body 20 has a storage section (memory 28a) that stores programs and parameters etc. that are required for operation of the camera body 2. This storage section may be provided in the CPU 28, for example. Obviously this storage section may also be provided separately from the lens CPU 28, and in this case the storage section and the lens CPU 28 are connected.

Also, each block of the camera body 20 is configured using hardware, for example. However, some blocks do not have to be configured using hardware, and may be configured using software. Also, each block of the camera body 20 need not be configured using a single hardware or software component, and may be configured using a plurality of hardware or software components. For example, some or all of the functions of the AF processing section 29 on the AE processing section 30 may be implemented by the CPU 28 using programs that have been stored in the storage section (memory).

The image sensor 21 having a function as an imaging section is arranged on the optical axis of the lens section 10a, close to an imaging position of the subject image. The image sensor 21 is provided with a plurality of pixels, and the plurality of pixels are arranged two dimensionally. Respective pixels have photoelectric conversion sections made up of photodiodes etc., and convert a subject image (optical image) to an electrical signal. Here, pixels of the image sensor 21 may also include focus detection pixels. Focus detection pixels are configured so as to restrict incident direction of incident light flux, for sample. As a configuration for the focus detection pixels, there are, for example, a configuration in which incident direction of light flux is restricted by means of a pupil-division that uses micro lenses, and a configuration in which incident direction of the light flux is restricted by light shielding some pixels. With this embodiment it is possible to use focus detection pixels of an arbitrary structure. It should be noted that in the description that follows, pixels of the image sensor 21 include focus detection pixels. The image sensor 21 functions as an imaging section that receives subject light and generates image data. The image sensor 21 receives subject light and generates image data.

The image signal processing section 22 has an image signal processing circuit, and performs various image processing such as amplification processing on an image signal that is output from each pixel of the image sensor 21. A signal that has been processed by the image signal processing section 22 is output to the bus 32.

The imaging control section 23 has an imaging control circuit, outputs imaging control signals (vertical synchronization signal of ED etc.) to the image sensor 21 in accordance with a control signal from the CPU 28, and performs control of charge accumulation in each pixel of the image sensor 21, and control of imaging signal readout.

The storage section 24 is a non-volatile semiconductor memory that is capable of being electrically rewritten, and may be fixed in the camera body 20, or may be removable. Various image data that has been generated by the camera body 20 is stored in the storage section 24. For example, image files that have been acquired as a result of shooting are stored in the storage section 24.

The display section 25 is a liquid crystal display or an organic EL display that is arranged on an outer part of a rear surface of the camera body 20 etc. The display section 25 displays various images such as live view images that have been acquired by means of the image sensor 21 and images that have been stored in the storage section 24. Various menu screens are also displayed on the display section 25. It should be noted that as well as being a display that is arranged on other than an outer part of the camera body 20, the display section 25 may also be an electronic viewfinder which is of a type for looking into a small display by means of an eyepiece.

The operation section 26 has various operation members that are operated by the user, and may also have an interface. As the operation section 26 various operating buttons such as a release button, movie button, mode button, selection key, power supply button etc., and various operation members such as a touch panel, may be included.

A release button has a 1st release switch and a 2nd release switch. The 1st release switch is a switch that is turned on by pressing the release button down halfway (1st release operation). If the 1st release switch is turned on, shooting preparation instructions such as AF (focus adjustment) and AE (exposure adjustment) are supplied to the CPU 28 which has a function as a focus adjustment instruction detection section. The 2nd release switch is a switch that is turned on by pressing the release button down fully (2nd release operation). If the 2nd release switch is turned on, a still picture shooting instruction is provided to the CPU 28 having a function as an instruction detection section. A movie button is on operation member for instructing movie shooting.

A mode button is an operation member for selecting shooting settings of the camera (imaging device). A selection key is an operation member for selecting and deciding on items on a menu screen, for example. A power supply button is an operation member for turning a power supply of the camera on or off. A touch panel is integrally formed on a display screen of the display section 25 and detects contact location of a user's finger etc. on the display screen. The CPU 28 executes processing in accordance with contact location of the user's finger etc. The touch panel functions as one example of a consecutive shooting mode setting section for switching operating mode of the camera to a continuous shooting mode (consecutive shooting mode), or a consecutive shooting setting section for setting consecutive shooting speed. Obviously functions of a consecutive shooting mode setting section and the consecutive shooting speed setting section may also be implemented using operation members other than the touch panel.

The memory 27 is an electrically rewritable memory, and temporarily stores various data such as data that has been processed by the image signal processing section 22, and processed data of the AF processing section 29 or the AE processing section 30. During continuous shooting mode (consecutive shooting mode), the memory 27 functions as a consecutive shooting buffer. The consecutive shooting buffer is a work buffer required for various computations etc. commencing with image processing during consecutive shooting mode.

The CPU 28 is a processor that performs control of the camera body 20, and has a CPU and peripheral circuits. As described previously, the CPU 28 may also have a memory 28a for storing programs and/or parameters etc. It should be noted that instead of being arranged inside the CPU 28, the memory 28a may be arranged outside the CPU 28. The CPU 28 controls operation of the image sensor 21 by controlling the imaging control section 23. Also, the CPU 28 commences AF operation and AE operation in response to the 1st release switch being turned on, and commences still picture shooting in response to the 2nd release switch being turned on. It should be noted that the CPU 28 is not always required to be a CPU, and may be configured using an ASIC or an FPGA etc. The CPU 28 functions as a control section that changes control of focus drive of the focus control section based on output of the index generating section.

The AF processing section 29 includes a processor for focus control, and calculates contrast evaluation value from an image signal that has been output from the image sensor 21 in accordance with drive of the focus lens 11. Also, the AF processing section 29 calculates shift direction (focus shift direction) and shift amount (focus shift amount) to an in-focus position from a phase difference between image signals that have been output from pairs of focus detection pixels, for example. The CPU 28 performs an AF operation using evaluation value and focus shift amounts and focus shift direction obtained by the AF processing section 29.

The AF processing section 29 has a neural network (inference engine) 29a that will be described later using FIG.

7. This neural network 29a has learning results (inference model) for classifying subject scenes set, and by inputting image data to an input section it is possible to obtain classification results for subject scenes. It is possible to judge whether or not there is a difficult to handle scene in accordance with the subject scene classification results. The neural network 29a can also be set with learning results (inference model) for judging Bokeh state of an image, and by inputting image data to the input section it is possible to judge Bokeh state of an image (focused, non-focused state etc.). Further, regarding learning results (inference model) for judging Bokeh state, most suitable learning results can be set respectively in accordance with individual subject scene. The AF processing section 29 and/or the CPU 28 function as a processor having a focus control section, index generating section and control section.

Figure 12:
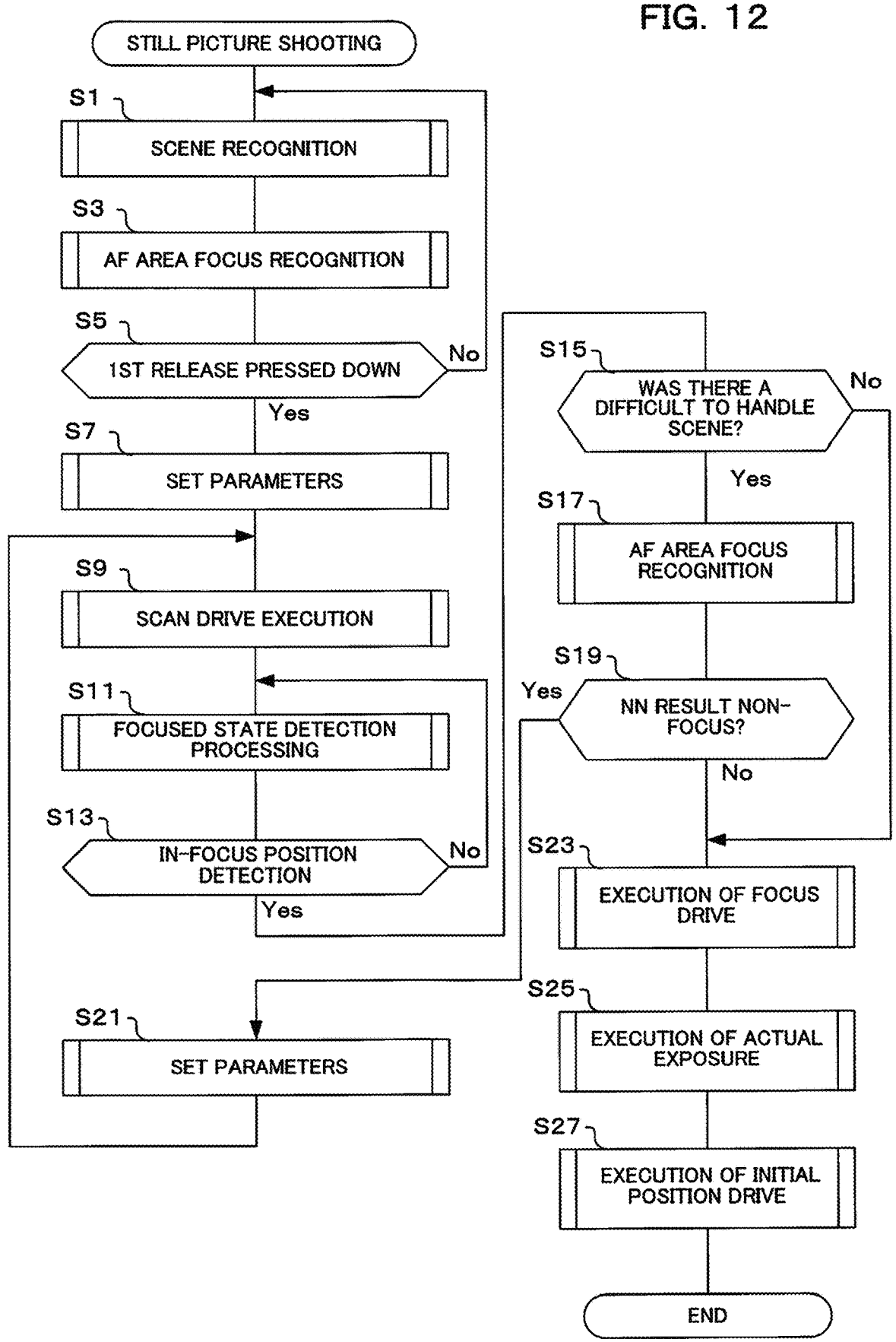
FIG. 12 is a flowchart showing a focus adjustment operation at the time of still picture shooting standby, in the camera of one embodiment of the present invention.

The AF processing section 29 functions as a focus control section that performs focus detection based on image data, and controls a focus operation based on focus detection results (refer to S23 in FIG. 12). The neural network 29a functions as an index generating section that is input with image data and generates a first index that represents which of a given plurality of image classifications image data is close to, and a second index that represents Bokeh state of an image corresponding to the image data (refer, for example, to S3 and S17 in FIG. 12, and S31 in FIG. 13).

Figures 9, 10:
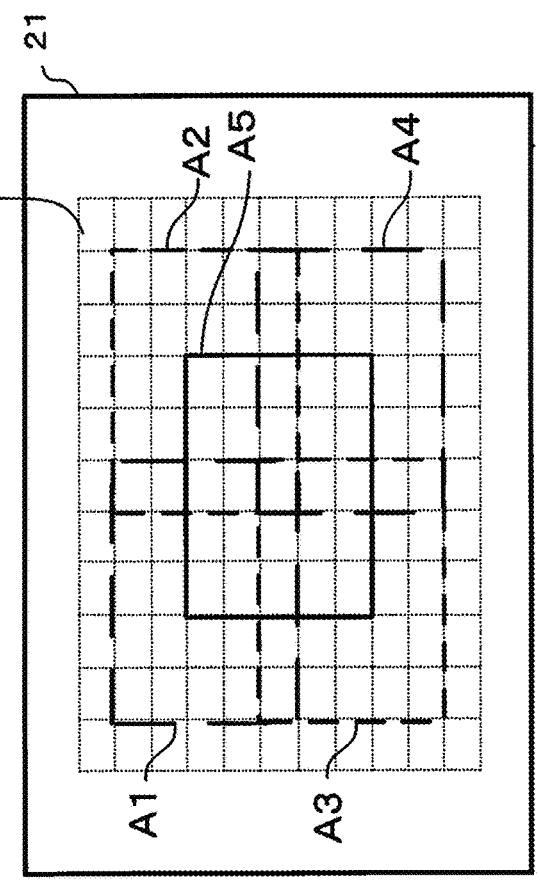
FIG. 9 is a table showing image data input to a neural network, in the camera of one embodiment of the present invention.
FIG. 10 is a drawing showing division of AF areas, in the camera of one embodiment of the present invention.

The above described index generating section has a first neural network that generates an index representing which of a plurality of image classifications image data is (refer, for example, to scene determination NN in FIG. 9) and a second neural network for generating an index representing Bokeh state of an image corresponding to image data (for example, the NN for focus state determination in FIG. 9). Also, the index generating section divides image data into a plurality of image data in accordance with image region, and respective image data that has been divided is input to the first and/or second neural network (refer, for example, to FIG. 10). Also, the index generating section neural network that includes convolution layers at an initial stage (refer, for example, to R1 to R3 in FIG. 7). Also, the index generating section includes night scene, or periodicity-containing subject scene, or a scene with a mix of near and far subjects, or scenes other than these, as a plurality of image classifications (refer, for example, to FIG. 3 to FIG. 6). It should be noted that the above described indexes may also be calculated not using neural networks, but using logic by the AF processing section 29 or the CPU 28 using programs.

Figure 2A:
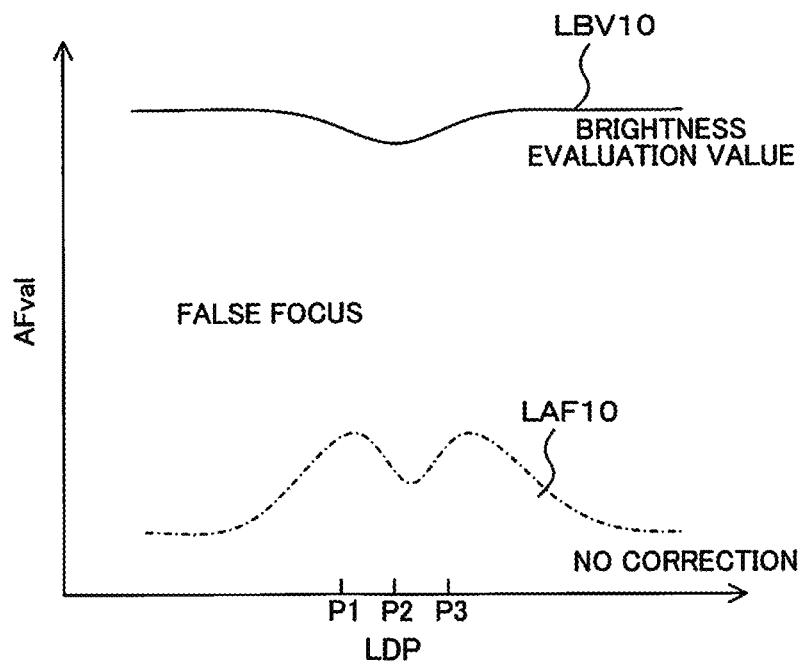
FIG. 2A and FIG. 2B are graphs for describing AF control in a case where a subject is a night scene, in the camera of one embodiment of the present invention.
Figure 2B:
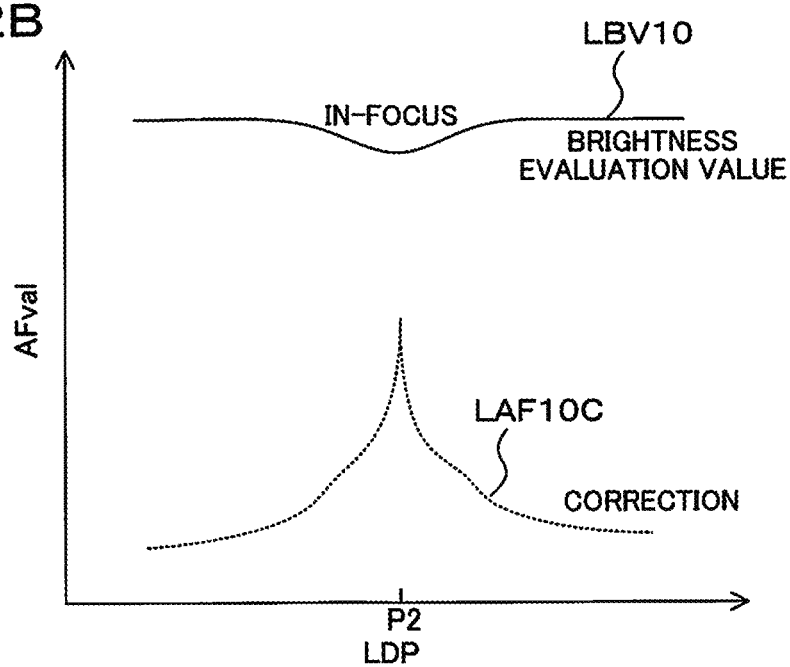

The above described focus control section performs correction of an evaluation value generated as a result of focus detection in accordance with brightness, in a case where an index output by the index generating section represents a night scene (refer, for example, to FIG. 2B). It should be noted that this function of the focus control section may also be performed by the CPU 28. The focus control section also performs focus detection by changing drive direction of the focus lens to the close-up end, in a case where an index output by the index generating section represents a scene with a mix of near and far subjects (refer, for example, to FIG. 5). Also, in a case where an index that is output by the index generating section represents a night scene, and an index representing Bokeh state represents a larger Bokeh amount than the specified amount, the focus control section makes a threshold value, for determining in focus, larger (refer, for example, to FIG. 3). In a case where the first index represents a significant Bokeh state, the focus control section drives the focus lens at a higher speed than normal (refer, for example to S7 and S9 in FIG. 12). It should be noted that each of the above described functions of the focus control section are not limited to the AF control section 29, and may be performed by the CPU 28, and may also be performed by the AF control section 29 and the CPU 28 acting in cooperation with each other.

Also, the second neural network of the above described index generating section has a plurality of neural networks in accordance with image classifications, and generates a second index by selecting a plurality of neural networks based on the first index (refer, for example, to FIG. 11 and S17 in FIG. 12). The index generating section divides image data into a plurality of image data in accordance with image region, performs image classification using a first neural network for respective regions and all images, and generates the first index based on the image classification results (refer, for example, to S31 in FIG. 13).

The AE processing section 30 calculates conditions for aperture value and shutter speed in order to achieve correct exposure of the image sensor 21 based on subject brightness. Subject brightness is calculated from an image signal that is output from the image sensor 21, for example. Subject brightness may also be measured using a dedicated light measurement sensor.

The strobe unit 31 has a light-emitting section for projecting light toward the subject. For example, the strobe unit 31 generates illuminating light for the subject when subject brightness is low or when there is backlighting.

Next, switching of an AF control method for each difficult to handle scene will be described using FIG. 2A and FIG. 2B, taking a night scene as an example. FIG. 2A and FIG. 2B are graphs showing, when a subject is a night scene, change in position of the focus lens 11 (refer to horizontal axis), and change in AF evaluation values (AFval, LAF10) and brightness evaluation value LVB10 at this time. FIG. 2A shows before AF evaluation value correction, while FIG. 2B shows after AF evaluation value correction.

In FIG. 2A an AF evaluation value (AFval) becomes a peak value at two positions, namely positions P1 and P2, and since focus detection is based on this false in-focus position it is not possible to detect a true in-focus position. FIG. 2B shows a case where correction of AF evaluation value has been performed for the state of FIG. 2A. The AF evaluation value shown in FIG. 2B becomes a peak value at position P2 and it is possible to detect a true in-focus position. As correction here, a correction value is calculated by multiplying the brightness evaluation value by two or multiplying by three, and then the AF evaluation value is corrected using this correction value.

However, even for a night scene, if it is not possible to judge that correction computation should be performed to process an AF evaluation value, and focus detection is performed using that AF evaluation value as is, significant Bokeh will occur. For example, as shown in FIG. 2B, correction of AF evaluation value for a night scene involves performing strong correction using brightness evaluation value (LBV10) on the AF evaluation value (LAF10) (refer to FIG. 2B). This means that if correction computation for a night scene is applied to an AF evaluation value for a general scene in the daytime, there will be overcorrection, AF brightness is lowered, and only slight Bokeh arises.

With this embodiment, therefore, an inference model is generated by learning difficult to handle scenes in advance using a neural network, and a subject scene can be reliably classified using this inference model. As a difficult to handle scene, with this embodiment there are three scenes, namely a night scene, a periodicity-containing subject, and a mixture of near and far subjects. At the time of learning, it is made possible to classify normal scenes (general scenes) besides these three scenes. For focused state also, a learning device can classify three states, namely a significant Bokeh state, a focused state, and an intermediate state. Further, when learning focused states, the learning device generates inference models that are respectively specific to a night scene, a periodicity-containing subject and a mix of near and far subjects, and the neural network 29a of the AF processing section 29 selects an inference model in accordance with the subject scene. It should be noted that the learning device is arranged in a server or the like that is external to the camera body 20, and inference models that have been generated by the learning device are transmitted to the camera body 20 via the Internet.

At the time of learning in the neural network, in the case of learning a night scene (refer to FIG. 3), a point light source scene is supplied to the learning device as input information. Also, in the case of a periodicity-containing subject scene, a periodic pattern, such as a print of a periodic pattern or a building window (refer to FIG. 4), is supplied to the learning device as input information. Also, in the case of learning a scene that is a mixture of near and far subjects, for example birds and bushes (refer to FIG. 5), faces and urban areas, or sunshine filtered through foliage, a pattern that has a mix of far away subjects and nearby subjects is supplied to the learning device as input information.

Figure 3:
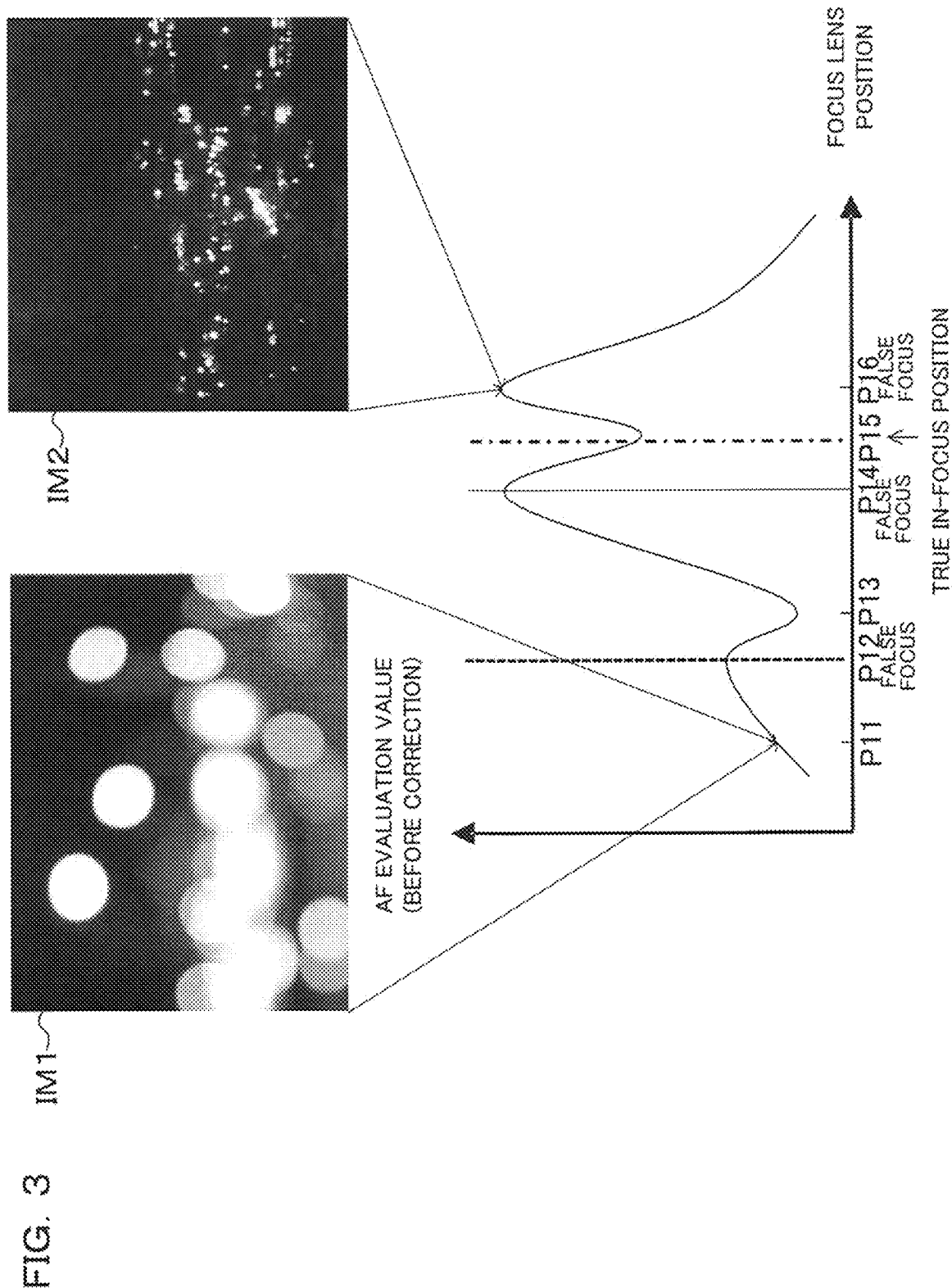
FIG. 3 is a drawing for describing AF control in a case where a subject is a night scene, in the camera of one embodiment of the present invention.

FIG. 3 is a drawing for describing AF control in a case where a subject is a night scene. The horizontal axis of the graph in FIG. 3 is focus lens position, while the vertical axis is AF evaluation value (the horizontal axis and the vertical axis are the also same in FIG. 4 to FIG. 6, and in FIG. 8). Image Evil is an image of a case where the focus lens 11 is at position P11. Since focus is not achieved at this position, there is a significant Bokeh state. Also, image IM2 is an image of a case where the focus lens 11 is at position P16. In this case, since the focus lens 11 is close to being in focus (a true in-focus position is P15) it constitutes an image that is slightly out of focus.

With this example where the subject is a night scene, an AF evaluation value becomes a maximum value at positions P12, P14 and P16 of the focus lens 11, as shown in FIG. 3, and becomes a minimum value at positions P13 and P15. in the case of a night scene, it is known that an AF evaluation value will become a minimum value at a true in-focus position due to the effect of bright spots. Accordingly, all of positions P12, P14 and P16 where there is a maximum value are false in-focus positions, and a true in-focus position is position P15.

An AF evaluation value corresponding to this type of night scene becomes a maximum value close to position P12, and there may be cases where position P12 is erroneously judged to be in focus. Therefore, in the case of a night scene, in focus judgment conditions are made stricter so as to avoid false focus where focus is determined with a maximum value for a lower value region that is apart from a maximum value of AF evaluation value positioned close to the true in-focus position P15 (for example, position P14). Also, in the vicinity of position P14 to position P16, by performing correction processing, such as disclosed in patent publication 1, a true in-focus position (P15) is detected, and focusing is performed at this position.

Figure 4:
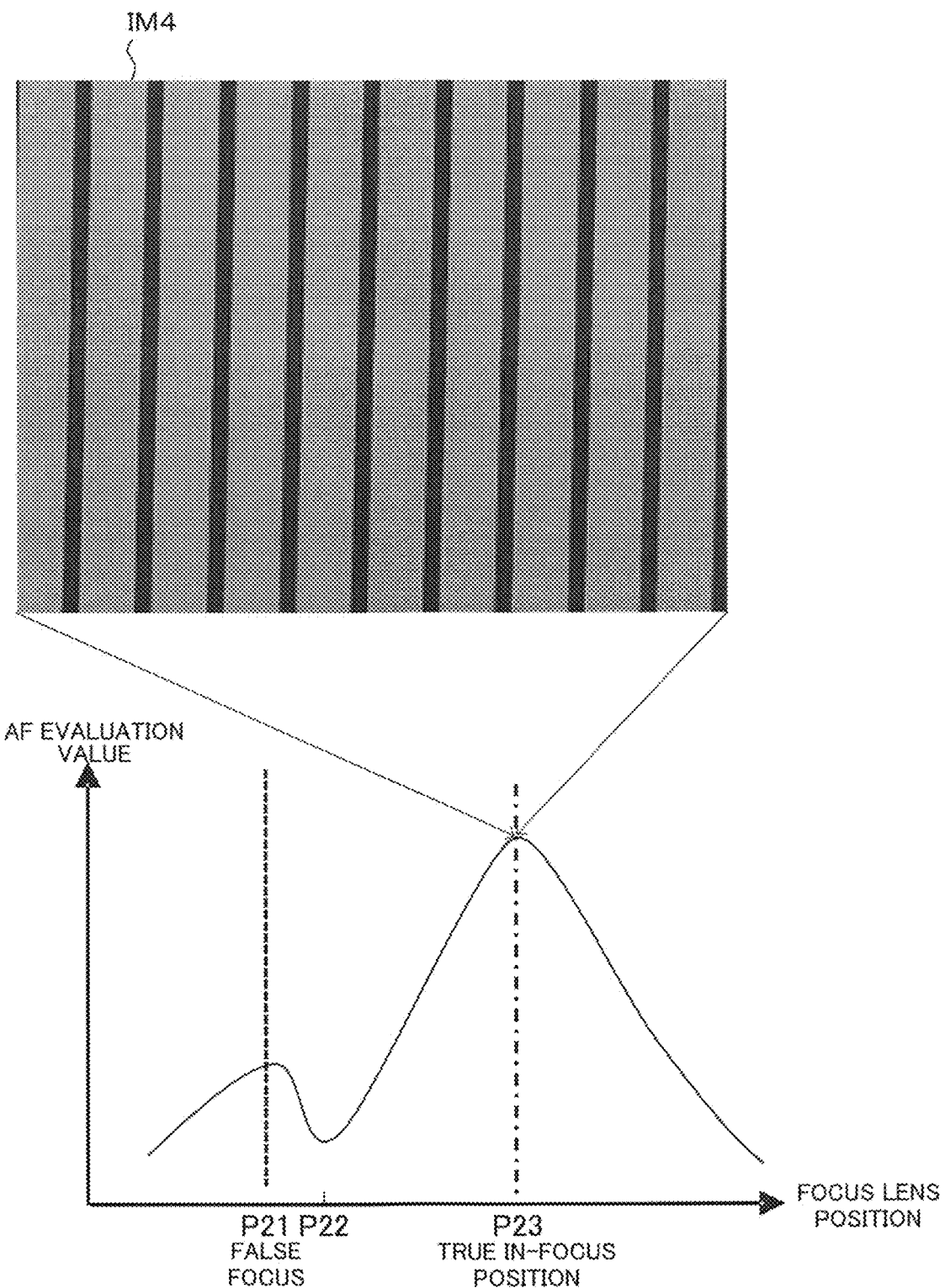
FIG. 4 describes AF control in a case where a subject has a periodic pattern, in the camera of one embodiment of the present invention.

FIG. 4 is a case of a scene where a subject has a periodic pattern. Image IM4 is an image for a case where the focus lens 11 is at P23 which is a true in-focus position, and is a focused state. AF evaluation value becomes a maximum value at positions P21 and P23 of the focus lens 11, and becomes a minimum value at position P22, as shown in FIG. 4. As will be understood from FIG. 4, AF evaluation value becomes a maximum at a lower value position P21 that is distant from the maximum value of AF evaluation value (position P23) positioned at the true in-focus position P23, and there may be cases where position P21 is erroneously determined to be in focus (false focus). Therefore, similarly to the case of a night scene, in a case where a subject is a periodic pattern, conditions fall determination of focus are made stricter.

FIG. 5 as a case of a scene with a mixture of near and far subjects. Image IM6 is a mixture of faraway subjects and nearby subjects, and while there is focus at a distance, there is not focus on a subject that is the main object of shooting, and this is an image with significant Bokeh. Image IM7 is an image of the scene of a bird in a bush. In this case the bird O7 that is the object of shooting is focused on, and there is a focused state for the bird O7.

AF evaluation value becomes a maximum value at positions P31 and P33 of the focus lens 11, and becomes a minimum value at position P32, as shown in FIG. 5. As will be understood from FIG. 5, AF evaluation value for P31 position that constitutes a maximum value is larger than AF evaluation value for position P33 that constitutes a maximum value. However, the object of shooting is in focus at position P33. Therefore, in the case of a scene that is a mix of near and far objects, even if it is assumed that focus has been determined at position P31, lens drive is performed anyway to a close-up end (right side on the horizontal axis) for a specified range (for example, about 50 Fδ converting to defocus amount) in order to confirm as to whether or not a subject is at the close-up end. By performing this processing, the focus lens is moved to the true in-focus position P33 and it is possible to focus on the main shooting objective. It should be noted that F in the term "50 Fδ" described above is aperture value, and δ is dimeter of permissible circle of confusion diameter.

FIG. 6 is an example of the scene of a general subject. Image IM9 is an image that is in a focused state. AF evaluation value Increases monotonously in accordance with movement of the focus lens 11 from a long distance side towards a close-range side. AF evaluation value becomes a maximum value of position P42, and after that the AF evaluation value decrease is monotonously in accordance with movement of the focus lens 11 towards the close-range side. This means that at position P41 in the skirt region there is almost no likelihood of focus being erroneously determined (false focus). Therefore, in the case where a subject is a general scene, since there is only a slight risk of false focus, AF evaluation value increases in accordance with movement of the focus lens 11, and if it is determined that the peak has been exceeded it is then determined that in-focus position has been detected. As a result of this AF processing it is possible to make processing time extremely short.

Next, a neural network for learning difficult to handle scenes will be described using FIG. 7. With this embodiment, AF control method is switched depending on the scene, as was described using FIG. 3 to FIG. 6. With this embodiment scene classification uses a neural network that uses deep learning. The neural network 29a is an inference engine that has been provided within the AF processing section 29.

Figure 7:
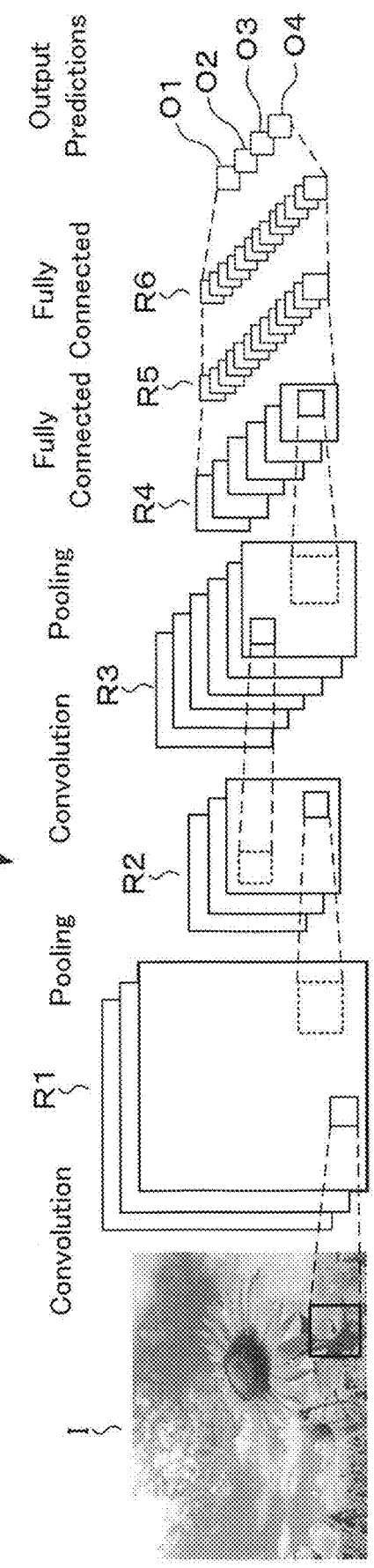
FIG. 7 is a drawing for describing a neural network that makes judgments on difficult to handle scenes, in the camera of one embodiment of the present invention.

The neural network 29a has an input section I, convolution layers R1 to R3, intermediate layers R4 to R6, and output sections O1 to O4, as shown in FIG. 7. From an initial stage to the third stage (R to R3) of the neural network 29a of this embodiment (R1 to R3) are convolution layers, while the 4th to 6th stages (R4 to R6) are intermediate layers. The input section I is input with images, and the convolution layers R1 to R3 only respond to signals of areas that have been limited. In the intermediate layers R4 to R6, strengths of connections between each neuron are determined by learning.

With deep learning, a variety of items of training data made up of classification results for input images and scenes are prepared, input images are input to the input section I, and convolution layer limited areas, and strengths of connections between each neuron are learned so that classification results are output. Learning results (inference models) are set in a neural network (inference engine) that is provided within the AF processing section 29, and classification results for scenes are output from the output section by inputting image data based on output of the image sensor 21 to the input section I.

In FIG. 7, for example, if an input image is a general scene, the fact that there is a general subject is output from output O1, and if the input image is a night scene the fact that there is a night scene is output from output O2. Also, for example, if an input image is a mix of near and far subjects, the fact that there is a scene with mixed near and far subjects is output from output O3, and if an input image is a periodic pattern the fact that there is a periodic pattern is output from output O4.

It should be noted that while deep learning that uses training data may be performed by the AF processing section 29 within the camera body 20, deep learning may be performed in advance using an external learning device for deep learning, and those learning results may be set in a neural network (inference engine) within the AF processing section 29.

Also, training data is not limited to the previously described subject scene classification, it is also possible to perform deep learning by preparing training data for focus state determination such as significant Bokeh state, in focus, intermediate state etc., and obtain learning results. These learning results are set in a neural network (inference engine) within the AF processing section 29. The neural network 29a can determine focus state using the learning results (inference model). Although it is better to make it possible to selectively set any of the plurality of classification learning results (inference model) in a single neural network, this is not limiting and a plurality of neural networks may be provided for each learning result.

Next, switching of AF control in the case of a difficult to handle scene (for example, night scene, periodicity, mix of near and far objects) will be described. In a case where a night scene (refer to FIG. 3) and a scene of sunshine filtered through foliage has been determined by the neural network 29a, the AF processing section 29 performs AF evaluation value correction computation for night view. AF evaluation value correction computation for night scene is evaluation value correction computation that is disclosed in patent publication 1, and is correction of an AF evaluation value using a brightness evaluation value (refer to FIG. 2B). It should be noted that the correction computation for AF evaluation value is not limited to being performed in the AF processing section 29, and may be performed in the CPU 28.

Also, in a case where a difficult to handle scene (for example, night scene, periodicity, mix of near and far objects) has been determined by the neural network 29a, focus determination conditions using contrast AF are made stricter. In this way, as was described using FIG. 3 and FIG. 5, it is possible to prevent determination of false focus due to noise etc. in a skirt region of AF evaluation value.

As a method of making the focus determination stricter, for example, it is possible to determine commencement of hill climbing using a hill-climbing method, that is, to make criteria for determination of commencement of a scan operation, in a direction in which AF evaluation value increases, stricter. Specifically, a threshold value for a number of frames in which it is determined that AF evaluation values that were acquired in time series are increasing, threshold value for change rate of increase in AF evaluation value, and threshold value for size of AF evaluation value itself, are respectively made larger than thresholds at the time of normal determination. Also, determinations given after having a hill for AF evaluation value has been climbed, that is, determination that an AF evaluation has exceeded a peak, is made more strict. Specifically, a threshold value for a number of frames in which it is determined that AF evaluation values that were acquired in time series are decreasing, threshold value for change rate of decrease in AF evaluation value, and threshold value for size of AF evaluation value itself, are respectively made larger than thresholds at the time of normal determination.

Also, with this embodiment, in the event that it is been determined by scene recognition that there is a significant Bokeh state, scan drive is performed at high speed (refer to S7 and S9 in FIG. 12). As was described previously, since learning results (inference model) for focus state determination are also set in the neural network of the AF processing section 29, it is possible to determine whether or not a focus state is a significant Bokeh state.

Also, it is easy for false focus to arise in the case of a difficult to handle scene. Therefore, when it has been determined during lens drive that it is almost in focus, or focus detection is possible, determination of whether or not there is a focused state is performed again by a neural network for focus state determination using an image of a final frame in the vicinity of focus (frame image when focus state detection has been performed in step S11 in FIG. 12). At this time, determination as to whether or not there is focus is performed by selecting a corresponding neural network for focus state determination based on a difficult to handle scene. If a non-focused state has been determined, lens drive and AF evaluation value detection are further performed, and confirmation that an in-focus position does not exist further on that direction is performed.

Figure 8:
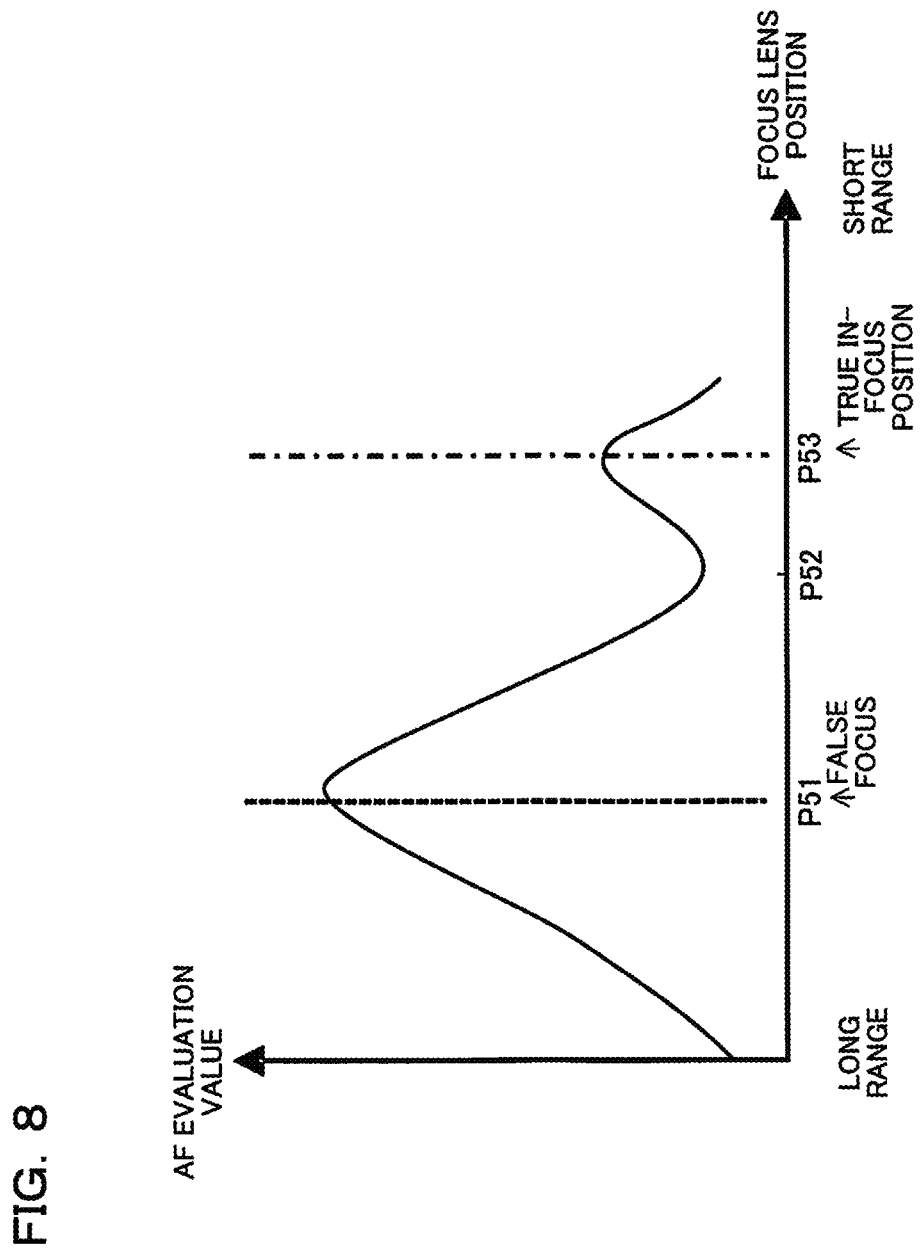
FIG. 8 is a graph for describing AF control in a case of a difficult to handle scene, in the camera of one embodiment of the present invention.

This point will be described using FIG. 8. FIG. 8 shows change in AF evaluation value in a case where the focus lens 11 has been moved from a long distance side toward the close-range side. With the example shown in FIG. 8, AF evaluation value becomes a maximum value at position P51, becomes a minimum value at position P52, and again becomes a maximum value at position P53. As was described previously, even if conditions for focus determination are made stricter by making a threshold value for focus determination large, in a case such as shown in FIG. 8 there is still a possibility of the focus lens being stopped at position P51, which is false focus, and erroneous determination of focus occurring.

Close to position P51, therefore, it is determined whether or not there is a non-focused state using the neural network 29a (NN for focus state determination) (refer to S17 in FIG. 12). If the result of this determination is a non-focused state, drive of the focus lens 11 continues (S19 Yes in FIG. 12). This determination is performed by inputting image data for only an AF area (this may also include areas close to that area) to the neural network 29a (NN for focus state determination). As was described previously, the neural network 29a of this embodiment is provided with convolution layers R1 to R3, which means that it is possible to infer a focus state for images of only the AF area and close to that AF area.

In FIG. 8, if it has been determined that there is a non-focused state close to position P51, focus lens drive continues further. At a point in time where the focus lens 11 has reached position P53, it is again determined whether there is focus or non-focus, using the neural network 29a (NN for focus state determination). With the example shown in FIG. 8, it is determined that position P53 is a true in-focus position, and it is possible to achieve focus on a photographed physical object.

Next, using FIG. 9, description will be given for image data that is input using the neural network (NN) for scene determination and the neural network for focus state determination, for each of three operating states, namely shooting standby in progress, at the time of still picture AF focus determination, and movie AF operation in progress. It should be noted that neural network (NN) for focus state determination for focus state determination may be further subdivided based on scene determination results, as shown in FIG. 11.

With shooting standby in progress, the camera displays live view in a state before still picture shooting, and while this is being performed the user is determining composition and looking for a photo opportunity. In the flowcharts shown in FIG. 12 and FIG. 14, which will be described later, the camera performs scene recognition during shooting standby (refer to S1 in FIG. 12 and FIG. 14), and learning results used at this time are the neural network for scene determination. Image data of an entire screen is input to the neural network for scene determination that is used with shooting standby in progress. As image data for this entire screen, with this embodiment a VGA image (640×480 pixels) is used, but an image of a greater or smaller size than this may also be used. Also, as will be described later, besides image data for the entire screen, image data corresponding to a plurality of divided areas (FIG. 10) is input to the neural network for scene determination.

The neural network for scene determination outputs whether there is a difficult to handle scene, specifically, whether there is either of a night scene, a periodic pattern scene, a mix of near and far objects scene, or a normal scene (general scene), based on image data that has been input. Also, the neural network for scene determination outputs whether there is either of a significant Bokeh state, a focused state, and an intermediate state that is other than the significant Bokeh state and the focused state, based on image data that has been input. Specifically, the neural network for scene determination outputs any one of the above described 4 scenes×3 focus states=12 states (for example, night scene and significant Bokeh state) based on input images. Also, the neural network for scene determination may be configured to individually output any one among the four scenes (for example, a mix of near and far objects scene, and any one among the three focus states (for example, focused state).

Also, at the time of shooting standby in progress (S3 in FIG. 12 and FIG. 14) the camera executes processing that uses the neural network for focus state determination. With shooting standby in progress, image data of an area that conforms to an AF area the user has set is input to the NN for focus state determination.

At the time of still picture AF focus determination, the user performs half pressing of a release button (1st release operation), which is a time at which in-focus position has been detected using an AF operation (S13 Yes in FIG. 12). If the half pressing has been performed, the focus lens 11 is driven, and an AF evaluation value is calculated based on image data from the image sensor 21. The focus lens 11 is driven to the in-focus position based on this AF evaluation value (refer to S9 to S13 in FIG. 12). When the focus lens has been driven to the in-focus position, if it has been determined in scene recognition (S1) that a subject is a difficult to handle scene, focus state is determined based on a neural network for focus state determination corresponding to the difficult to handle scene (refer to S17 in FIG. 12). At this time, image data corresponding to a single AF area that has been selected, from among image data of frames that were acquired at the time that in-focus position was detected, is input to the neural network for focus state determination. This AF area is an AF area that has been selected by the user, or an AF area that has been selected automatically.

Figure 14:
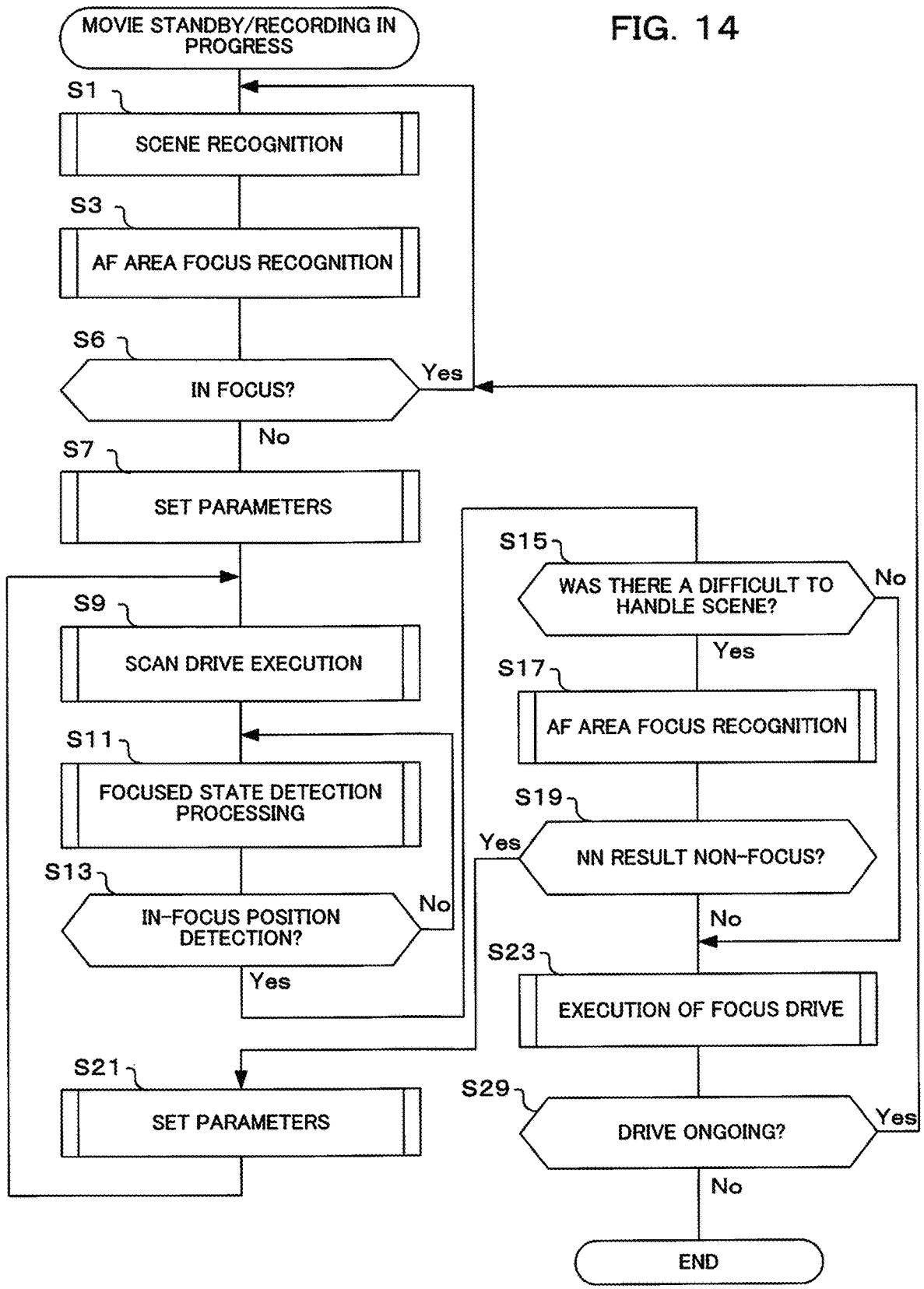
FIG. 14 is a flowchart showing a focus adjustment operation at the time of movie shooting standby/recording, in the camera of one embodiment of the present invention.

With movie AF operation in progress, image data of an entire screen, and image data of divided areas, is input to the neural network for scene determination, and a scene is determined (S1 in FIG. 14). Also, image data of an area that conforms to an AF area that has been set by the user is input to the neural network for focus state determination.

Next, image data that is input to the neural network for scene determination will be described using FIG. 10. In a case where an entire screen is input, the entire screen is resized to a VGA image, as was described previously, and this image data that has been resized is input to the neural network for scene determination. In addition to that, the neural network for scene determination is input with image data of divided areas that have been appropriately divided in accordance with a range in which a plurality of AF areas (in FIG. 10, reference numeral al attached to one among a plurality of AF areas is shown) exist.

With the example shown in FIG. 10, the divided areas are set by dividing a range in which a plurality of AF areas exist, within the entire screen, into five areas. Specifically, the entire screen is divided into a divided area A1 at the upper left of the screen, a divided area A2 at the upper right of the screen, a divided area A3 at the lower left of the screen, a divided area A4 at the lower right of the screen, and area A5 close to the center of the screen is further provided. If an AF area is selected by the user, this divided area A5 may also be set to a divided area A5 that has a center that is aligned with central coordinates of this AF area that has been selected. At the time of all target mode also, which will be described later, the divided area A5 may also be set to a divided are A5 having a center aligned with central coordinates of a central AF area, among a plurality of AF areas that have been selected. In this way, by providing a plurality of divided areas and overlapping the divided areas on each other, it is possible to reliably determine a scene even in a case where a plurality of scenes are mixed. Detailed operation of scene determination by the neural network for scene determination will be described later using FIG. 13.

It should be noted that with this embodiment inference is performed by inputting image data (image information) to the neural network for scene determination and the neural network for focus state determination. However, input to the neural networks is not limited to image information, and inference may be performed by inputting focal length, aperture value (F No.), focus lens position (subject distance information), brightness value (BV value), motion vector information etc. At this time, the number of bits of data that is input may be normalized by making it the same number of bits as for image information (for example, if image data has values of 0 to 255, the data will also have values of 0 to 255).

Next, the neural network for focus state determination will be described. Learning results (inference model) set in the neural network for focus state determination are acquired by inputting in-focus images and non-focus images as training data. FIG. 11 is a table showing type of neural network for focus state determination used at the time of focus determination with still picture AF, in accordance with scene. The neural network for focus state determination is used by selecting a neural network for focus state determination corresponding to a scene (S1 in FIG. 1: scene recognition) that has been detected with shooting standby in progress (S3 and S17 in FIG. 12). These neural networks for focus state determination have images that are in focus and non-focus images input to a learning device as respective training data for subjects corresponding to respective scenes, and have learning results (inference model) set that have learned focus/non-focus.

In single target AF mode, image data within an AF area that has been selected and has been determined to be in focus is resized to about 50×50 pixels, and input to the neural network for focus state determination. In all target mode, and group target mode also, image data within an AF area that has been determined to be in focus is similarly made input data for the neural network for focus state determination. It should be noted that all target mode is an AF mode with which it is possible to select all of a plurality of AF areas, an AF area is automatically selected from among all of the AF areas in accordance with a specified selection algorithm (for example, closest selection), and AF control is executed. Also, group target mode is a mode in which a group is formed by selecting a given number (a plurality) of AF areas that are adjacent, from among all AF areas, and AF control is executed based on detections results of an AF area contained in a group (such as 3×3 areas, 5×5 areas etc.).

Also, with movie AF operation in progress (during movie shooting standby/storage) determination of focus state is constantly performed using the neural network for focus state determination (refer to S17 in FIG. 14). In this case, significant Bokeh and medium Bokeh are treated as non-focus. Image data that is input to the neural network for focus state determination is image data corresponding to the previously described area that conforms to an AF area. In a case where AF mode is group target mode, image data corresponding to an AF area group for a group target of 3×3, with an AF area that has been set by the user as a center, is input. In either case, image data that is input to the neural network for focus state determination is used by being resized to a size of about 50×50 pixels. Also, in the case of all target mode, the neural network (NN) for focus state determination may also determine whether or not there is focus by inputting image data corresponding to divided areas A1 to A5 resulting from having divided the screen into five, similarly to the scene determination NN. If a result of determination using the neural network for focus state determination is close to in focus in any area of the AF areas A1 to A5, in focus is finally determined. In a case where close to in focus has not been determined, if it is a mix of near and far objects scene scan drive is commenced in the close-range direction. Also, a case where close to in focus has not been determined, if it is a night scene the scanning towards the infinity end continues, and if it is a periodic pattern scan in the other direction continues.

Figure 13:
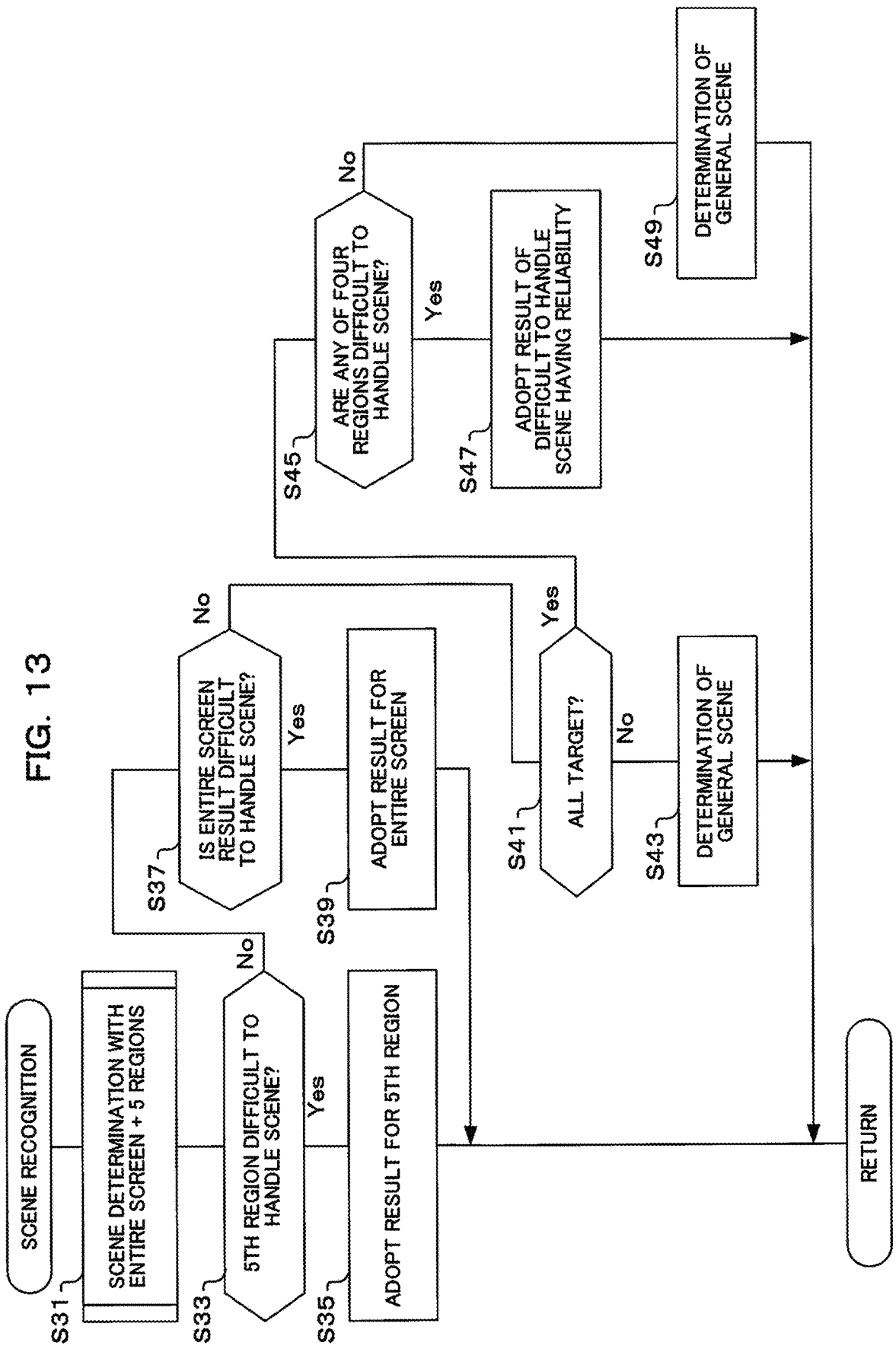
FIG. 13 is a flowchart showing operation for scene recognition, in the camera of one embodiment of the present invention.

Next, the focus adjustment operation of this embodiment will be described using the flowcharts shown in FIG. 12 to FIG. 14. These flowcharts are implemented by the CPU 28 controlling each section within the camera body 20 or within the interchangeable lens 10 based on programs that have been installed in the memory 28a. The flowchart shown in FIG. 12 shows a focus adjustment operation during still picture shooting standby, and at the time of still picture shooting.

With the flow for still picture shooting shown in FIG. 12, live view display is performed with shooting standby in progress, and if the release button is pressed down halfway focusing is performed. If the flow of FIG. 12 is commenced, first, scene recognition is performed (S1). Here, the AF processing section 29 determines a subject scene using the neural network for scene determination (refer to FIG. 3 to FIG. 6 and FIG. 9), and it is determined whether or not it is a difficult to handle scene. It is also determined if an input image is a significant Bokeh state, a focused state or an intermediate state. With scene recognition, the AF processing section 29 classifies into four scenes that were described using FIG. 3 to FIG. 6, namely a night scene, periodicity, mix of near and far objects, or a general scene, and classifies into three focus states, namely a significant Bokeh state, a focused state, or an intermediate state, and then classifies into any one among these 12 states (4 scenes×3 focus states).

If the scene recognition has been performed in step S1, next AF area focus recognition is performed (S3). Here, the AF processing section 29 determines whether or not an AF area that has been selected is in focus using the neural network for focus state determination. As an AF area, if the user has designated an area, that AF area is used, while if the user has not designated an area an area is automatically selected by the camera. As an automatic selection method, for example, face detection results may be used, or an AF area may also be an area that concerns a subject that is at close range.

If AF area focus recognition has been performed, it is next determined whether or not a 1st release pressing down operation has been performed (S5). Here, determination is based on whether or not the 1st release switch of the operating section 26 has been turned on. If the result of this determination is that 1st release has not been pressed down, processing returns to step S1.

On the other hand, if the result of determination in step S5 is that 1st release has been pressed down, parameters are set (S7). Here, the CPU 28 or the AF processing section 29 decides on an AF evaluation value correction computation method. For example, if the result of scene recognition in step S1 is night scene, then correction such as disclosed in patent publication 1 etc. is determined. A focus determination method is also determined. As was described previously, if the result of scene recognition is that the subject is a difficult to handle scene, the CPU 28 or the AF processing section 29 make focus determination conditions (for example, making a threshold value constituting a determination reference larger than normal) more strict. Scan drive speed is also determined. If, at the time of scene recognition, an entire screen or a divided region A5 is determined to be a significant Bokeh state, then the CPU 28 or the AF processing section 29 set a scan speed to be faster than normal.

Once parameters have been set, next scan drive is invoked (S9). Here, the lens control section 13 drives the focus lens 11. During drive, the imaging control section 23 reads out image data from the image sensor 21 at specified time intervals. Also, if, in the scene recognition of step S1, the entire screen or divided region A5 have been determined to be a significant Bokeh state, then as was described previously, the lens control section 13 performs lens scan at a faster speed than normal.

If scan drive has been commenced, next detection of focused state is performed (S11). Here, the AF processing section 29 calculates AF evaluation value using image data that was acquired during the scan drive of step S9. Hill climbing AF is executed to determine whether this AF evaluation value that has been calculated is continuously increasing, has transitioned to decreasing from increasing, or is continuously decreasing.

Next, it is determined whether or not an in-focus position has been detected (S13). Here, the AF processing section 29 determines whether or not the focus lens 11 is close to an in-focus position based on the focused state detection processing of step S11. That is, the focus lens 11 is moved using scan drive, and it is determined whether or not the AF evaluation value has exceeded a peak. It should be noted that in the event that a difficult to handle scene has been determined in the scene recognition of step S1, the AF processing section 29 changes a value of a threshold value for focus determination, as was described previously, to make focus determination more strict. If the result of this determination is not close to an in-focus position, processing returns to step S11 and the previously described operation is repeatedly executed.

It should be noted that in the event that phase difference AF is adopted as a focus detection method instead of contrast AF, then in steps S9 and S11 shift amount and shift direction for focus are calculated based on a pixel signal from focus detection pixels (pixels for which incident direction of light flux that is incident is restricted). Then, in step S13, movement amount and movement direction of the focus lens are calculated based on the movement amount and movement direction that have been calculated, and it is determined whether or not an in-focus position has been detected.

If the result of determination in step S13 is close to an in-focus position, it is next determined whether or not there was a difficult to handle scene (S15). Here, the AF processing section 29 performs determination based on the result of scene recognition in step S1.

If the result of determination in step S15 is that there was a difficult to handle scene, AF area focus recognition processing is performed (S17). Here, the AF processing section 29 determines whether or not image data from the image sensor 21 is focused (non-focus) using the neural network for focus state determination. In this case, if a result of inference using the neural network for focus state determination is small Bokeh, it is not determined to be in focus.

If AF area focus recognition processing has been performed in step S17, it is next determined whether or not determination results with the neural network for focus state determination are non-focus (S19).

If the result of determination in step S19 is non-focus, parameters are set (S21). Here, the AF processing section 29 again sets parameters that were set in step S7 based on results that have been determined by the neural network for focus state determination. For example, in the case of night scene, or periodic pattern scene, parameters are set again so as to make focus determination more strict, so that false focus does not occur in an area of lower AF evaluation values. Also, in the case of a mixed near and far subjects scene, lens drive is performed again to the close-up end, and parameters are set again so that it is possible to determine whether or not there is a subject at the close-up end. If parameters have been set, processing returns to step S9, and the previously described focus adjustment operation is executed.

On the other hand, if the result of determination in step S19 is not non-focus (that is in the case of focus), or if the result of determination in step S15 is that there was not a difficult to handle scene, focus drive is executed (S23). Here, the AF processing section 29 calculates interpolated in-focus position by performing approximate expression computation from close to an evaluation value peak position, if contrast AF is being used, based on the in-focus position that was detected in steps S11 and S13. The AF processing section 29 then drives the focus lens 11 towards this interpolated in-focus position using the lens control section 13. Also, the focus drive may be omitted in the event that an absolute value of a difference between the interpolated in-focus position that has been calculated and the current position is smaller than a given value.

If focus drive has been executed, next actual exposure is executed (S25). If full pressing of the release button has been performed and the 2nd release switch is turned on, the CPU 28 executes actual exposure. For actual exposure, in a case where a mechanical shutter is provided in the camera body 20 exposure time is controlled using this mechanical shutter. In a case where a mechanical shutter is not provided, exposure time is controlled using an electronic shutter of the image sensor 21. Once the exposure time has elapsed, the imaging control section 23 reads out image data from the image sensor 21. After the image data that has been read out has been subjected to image processing in an image signal processing section 22 etc., image data is stored in the storage section 24.

If actual exposure is complete, initial position drive is executed (S27). Here, the AF processing section 29 drives the focus lens 11 so that position of the focus lens 11 at the time of commencement of the next scan is optimum. Once initial position drive has been executed, this flow is terminated.

Next, operation of the scene recognition in step S1 of FIG. 12 will be described using the flowchart shown in FIG. 13.

If the flow for this scene recognition is commenced, first scene determination is performed using the neural network for scene determination, in the entire screen+5 regions (S31). As was described previously, learning results for scene determination are previously set in the neural network for scene determination of the neural network 29a within the AF processing section 29. The neural network 29a is input with image data from the image sensor 21, and performs subject scene determination. As scene recognition, there is classification into the four scenes that were described using FIG. 3 to FIG. 6, namely a night scene, periodicity, mix of near and far objects, or a general scene, and classification into three focus states, namely a significant Bokeh state, a focused state, or an intermediate state, and then classification into any one among this total of 12 states (4 scenes×3 focus states). When inputting image data from the image sensor 21 to the input section of the neural network 29a, image data of the entire screen is input and scene determination is performed for the entire screen. Also, image data for each of the five areas, namely the divided areas A1 to A5 as was described using FIG. 10, is input, and scene is determined for each area. Accordingly, in this step scene of the entire screen, and scenes for each divided area, are determined. Output of the neural network for scene determination is output of any single one among the 12 states (4 scenes×3 focus states) as results of respective scene determination (6 outputs), for the entire screen and the divided regions A1 to A5.

If scene has been determined for the entire screen+five regions, it is next determined whether or not a fifth region is a difficult to handle scene (S33). Here, the AF processing section 29 determines whether or not scene determination result for a fifth region, namely divided area A5 in FIG. 10, is a difficult to handle scene, such as a night scene, periodicity, mix of near and far objects etc., based on the scene determination result of step S31.

If the result of determination in step S33 is that the divided area A5 is a difficult to handle scene, the determination result for divided area A5 is adopted (S35). Since the divided area A5 is a region that contains the AF area that has been selected, the AF processing section 29 adopts the scene determination result (either of night scene, periodicity, or mix of near and far objects etc.) for divided area A5 as a result of scene recognition for the subject, regardless of the scene determination result for the other divided areas A1 to A4, and makes this result the output of scene recognition.

On the other hand, if the result of determination in step S33 is that divided area A5 is not a difficult to handle scene, it is next determined whether a result of scene determination for the entire screen is a difficult to handle scene (S37). Since a scene of the entire screen is judged in step S31, the AF processing section 29 performs determination based on this determination result. Accordingly, the AF processing section 29 determines whether or not the entire screen is a difficult to handle scene, such as a night scene, periodicity, a mix of near and far objects etc.

If the result of determination in step S37 is that the result of scene determination for the entire screen is a difficult to handle scene, the result of scene determination for the entire screen is adopted, and this is made scene recognition output (S39).

On the other hand, if the result of determination in step S37 is that the result of scene determination for the entire screen is not a difficult to handle scene, it is next determined whether or not it is all target mode (S41).

If the result of determination in step S41 is not all target mode, a general scene is determined, and this is made the scene recognition output (S43). In this case, since the divided area A5 containing the AF area that has been selected, and the entire screen, are not a difficult to handle scene, and it is not all target mode, additional scene determination for the divided areas A1 to A4 is not required, and a general scene is confirmed.

If the result of determination in step S41 is all target mode, it is determined whether either of the four regions (divided regions A1 to A4) is a difficult to handle scene (S45). This is because in the case of all target mode, it can be assumed to be a condition where it is better to reselect another AF area from an AF area that is currently being selected due to movement of the main subject etc. Here, the AF processing section 29 determines whether or not either of the divided areas A1 to A4 is a difficult to handle scene (night scene, periodicity, mix of near and far objects etc.) based on the scene determination results of step S31.

If the result of determination in step S45 is that either of the four regions is a difficult to handle scene, a result for a difficult to handle scene having the highest reliability is adopted (S47). Here, among the regions that have been determined to be a difficult to handle scene (divided regions A1 to A4), the AF processing section 29 adopts a result that has been determined to have the highest reliability of scene recognition. On the other hand, if the result of determination in step S45 is that none of the four regions are a difficult to handle scene, the AF processing section 29 determines a general scene, and makes general scene the output of scene recognition (S49).

If output of scene recognition has been determined in steps S35, S39, S43, S47 or S49, the flow for scene recognition is terminated and the originating flow is returned to.

Next, operation during movie standby and movie storage will be described using the flowchart shown in FIG. 14. Compared to the flow for still picture shooting standby that was shown in FIG. 12, this flow is the same apart from the fact that step S5 is replaced with "focus?" of S6, and steps S25 and S27 are replaced with "is movie ongoing?" of S29. Description will therefore concentrate on this point of difference. With processing for movie standby/recording in progress, movie recording is executed if movie recording has been instructed using the movie recording button: etc., while if movie recording has not been instructed a standby state is entered without movie recording.

If the flow for movie standby/recording in progress is entered, scene recognition is executed (S1). The AF processing section 29 performs processing using the neural network for scene determination for during the movie AF operation of FIG. 9. Next, the AF processing section 29 performs AF area focus recognition, and, for an AF area that is selected, determines whether or not there is focus using a neural network for focus state determination that is selected, based on results of scene recognition (S3). If the result of scene recognition is that a difficult to handle scene has been determined, processing is performed by selecting the neural network for focus state determination shown in FIG. 11 based on that result. It is next determined whether or not there is focus based on the result of AF area focus recognition. If the result of this determination is that there is focus, processing returns to step S1.

If the result of determination in step S6 is that there is not focus, then in step S7 and after the AF processing section 29 executes processing for driving the focus lens 11 to an in-focus position. First, parameters are set (S7), scan drive is executed (S9), and focused state detection processing is performed (S11). Based on the results of this detection processing the AF processing section 29 determines whether or not an in-focus position has been detected (S13), and if an in-focus position has been detected it is determined whether or not there is a difficult to handle scene based on the result of scene recognition in step S1 (S15). If the result is a difficult to handle scene, the AF processing section 29 executes AF area focus recognition, and determines whether or not there is focus using a neural network for focus state determination corresponding to the difficult to handle scene that has been determined (S17).

Next, the AF processing section 29 determines whether or not a determination result by the neural network for focus state determination corresponding to the difficult to handle scene of step S17 is non-focus (S19). If the result of this determination is non-focus, the AF processing section 29 sets parameters based on difficult to handle scene being determined (S21), processing returns to step S9, and focus adjustment is executed again. On the other hand, if the result of determination in step S19 is not non-focus, that is, focus, or if there is not a difficult to handle scene in step S15, the AF processing section 29 executes focus drive to an interpolated in-focus position that has been calculated based on in-focus position that was detected in step S11 (S23). Next, it is determined whether or not movie shooting standby or movie recording are ongoing (S29). If this determination result is ongoing, processing returns to step S1. On the other hand, if the result of determination in step S29 is that not ongoing has been determined, the flow for movie standby/recording in progress is terminated.

As was described above, with one embodiment of the present invention, image data is generated by receiving subject light using an image sensor, image data is input, a first index (for example, scene discrimination) that represents whether image data is close to any of a plurality of image classifications, and a second index (for example, focus state discrimination) that represents Bokeh state of an image corresponding to the image data, are generated, focus detection is performed based on the image data, a focus operation is controlled based on a focus detection result, and this focus operation is changed based on the first index and the second index (refer, for example, to FIG. 12).

Also, with the one embodiment of the present invention, image data is input, a first index representing if the image data is close to any of a specified plurality of image classifications is generated (for example, S1 in FIG. 12 and S31 in FIG. 13), and it is determined whether or not the focus lens is close to an in-focus position (S13 in FIG. 12). In the event that the result of this determination is that the focus lens is close to an in-focus position, then if a specified image classification has been determined based on the first index (for example, S15 Yes in FIG. 12) a second index representing Bokeh state of an image corresponding to the image data is generated (refer, for example, to S17 in FIG. 12). Whether or not there is a true in-focus position is determined based on this second index (refer, for example, to S19 in FIG. 12), and if the result of this determination is that there is a true in-focus position the focus lens is driven to the true in focus position (refer, for example, to S23 in FIG. 12). As a result, it is possible to prevent wasteful AF operation such as false focus or non-focus, even if a subject is one of various difficult to handle scenes.

Also, with one embodiment of the present invention, whether or not there is a difficult to handle scene is determined by the neural network 29*a* during live view display (refer, for example to S1 in FIG. 12), and if there is a difficult to handle scene AF control is switched in accordance with the scene (refer, for example, to S17, S19 and S21 in FIG. 12). This means that it is possible to perform AF control in accordance with a subject scene, and it is possible to prevent false focus and prevent wasteful AF operation.

Also, with one embodiment of the present invention, difficult to handle scene determination is performed by a neural network using deep learning. This means that it is possible to classify the subject scene with good efficiency and precisely. Also, convolution layers are provided in the initial stage of the neural network. This means that it is possible to determine respective scenes in a plurality of regions within a screen.

Also, with one embodiment of the present invention, in the event that it has been determined that a subject scene is a night scene, in the case of contrast AF a brightness evaluation value is multiplied by 2 or multiplied by 3 to give a correction value, and AF evaluation value is corrected using this correction value (refer, for example, to FIG. 2B, and steps S11 and S13 in FIG. 12). Also, if a night scene has been determined, a determination reference for focus determination is made stricter than normal (refer, for example, to S7, S11 and S13 in FIG. 12). This means that it is possible to prevent false focus even if a subject is a night scene, and it is possible to reliably focus to an in-focus position.

Also, with one embodiment of the present invention, in the event that a subject scene has been determined to be a night scene or significant Bokeh, the focus lens is driven faster than normal, and a determination reference for focus determination is made stricter than normal (refer, for example, to FIG. 3, and S7, S9, S11 and S13 in FIG. 12). This means that it is possible to prevent false focus even if a subject scene is a night scene or has significant Bokeh (blurred or very blurred), and it is possible to arrive at an in-focus position quickly.

Also, with one embodiment of the present invention, if a subject scene has been determined to be a periodicity-containing subject, a determination reference for focus determination in contrast AF is made stricter than normal (refer, for example, to FIG. 4 and to S7, S11 and S13 in FIG. 12). This means that it is possible to prevent false focus even if a subject is a periodicity-containing subject, and it is possible to reliably focus to an in-focus position.

Also, with one embodiment of the present invention, if a subject scene has been determined to be a mix of near and far objects, significant lens drive is performed to the close-up end and confirmation that there is not a subject in front is performed (refer, for example, to FIG. 5 and S7, S11 and S13 in FIG. 12). This means that it is possible to prevent false focus such as focusing far away even if a subject is a mix of near and far objects, and it is possible to reliably focus to an in-focus position.

Also, with one embodiment of the present invention, in the event that a subject has been determined to be a difficult to handle scene (for example, night scene, periodicity, mix of near and far objects), if an in-focus position has been approached as a result of performing AF control (refer, for example, to S13 and S15 in FIG. 12), scene determination is performed again using an image of a frame at the time of focus determination, and determination as to whether or not there is a close to focused state is performed (refer, for example, to S17 and S19 in FIG. 12).

Also, with one embodiment of the present invention, while 1st release is pressed down with shooting standby in progress a neural network is switched (refer, for example, to FIG. 9, FIG. 11 and S3, S5 and S17 in FIG. 12). This means that it is possible to perform respectively optimum inference for processing with shooting standby in progress and while 1st release is being pressed down, and it is possible to perform optimum AF control in accordance with respective conditions.

Also, with one embodiment of the present invention, a scene determination neural network (NN) divides an entire screen in to a plurality of regions, and determination results are output for respective regions (refer, for example, to FIG. 10). This means that it is possible to perform optimum AF control even in the event that a plurality of subjects exist within a screen.

Also, with one embodiment of the present invention, a neural network (NN) for focused state determination is switched in accordance with determination result for a subject scene (refer, for example, to FIG. 11 and S17 in FIG. 12). This means that it is possible to perform AF control in accordance with subject scene.

It should be noted that with one embodiment of the present invention, learning is performed using deep learning. However, the present invention is not limited to deep learning and learning that uses artificial intelligence, such as machine learning, may also be used. Also, results generated in advance by an external device may be input as a learning result (inference model), and this result (inference model) set in a neural network 29*a*. However, this is not limiting, and a neural network for learning may be built into the camera etc. and learning results (an inference model) may be generated while collaborating with an external database or the like. Further, a neural network 29*a* is provided in the camera, and inference is performed. However, this is not limiting, and it is also possible to arrange a neural network that has been provided within an external cloud, to continuously connect using the Internet etc., and to perform focus adjustment etc. based on inference results from the neural network within the cloud.

With one embodiment of the present invention, description has been given with three types of scene, namely night scene, periodicity and mix of near and far objects, as a difficult to handle scene. However, the present invention is not limited to these three types of scene, and other scenes may be added. Also, description has been given for scenes in which a point light source exist, such as the existence of illumination such as stars in the night sky, illuminations within a night scene etc., as a night scene. Besides this, as a scene in which a point light source exists, there may also be cases where a sample having bright spots is observed using a fluorescence microscope. In the case of observing such a sample that has bright spots, it is possible to also adopt the method of the present invention at the time of forming and image of this sample and performing focus adjustment.

Also, with one embodiment of the present invention, the image signal processing section 22, imaging control section 23, AF processing section 29, AE processing section 30 etc. are configured separately from the CPU 29, but some or all of these components may be configured integrally with the CPU 29. It is also possible for these sections to have a hardware structure such as gate circuits that have been generated based on a programming language that is described using Verilog, and also to use a hardware structure that utilizes software such as a DSP (digital signal processor). Suitable combinations of these approaches may also be used.

Also, with the one embodiment of the present invention, an instrument for taking pictures has been described using a digital camera, but as a camera it is also possible to use a digital single lens reflex camera or a compact digital camera, or a camera for movie use such as a video camera, and further to have a camera that is incorporated into a mobile phone, a smartphone a mobile information terminal, personal computer (PC), tablet type computer, game console etc., or a camera for a scientific instrument such as a microscope, a camera for mounting on a vehicle, a surveillance camera etc. In any event, it is possible to adopt the present invention as long as a device performs focus adjustment of a lens.

Also, among the technology that has been described in this specification, with respect to control that has been described mainly using flowcharts, there are many instances where setting is possible using programs, and such programs may be held in a storage medium or storage section. The manner of storing the programs in the storage medium or storage section may be to store at the time of manufacture, or by using a distributed storage medium, or they be downloaded via the Internet.

Also, with the one embodiment of the present invention, operation of this embodiment was described using flowcharts, but procedures and order may be changed, some steps may be omitted, steps may be added, and further the specific processing content within each step may be altered. It is also possible to suitably combine structural elements from different embodiments.

Also, regarding the operation flow in the patent claims, the specification and the drawings, for the sake of convenience description has been given using words representing sequence, such as "first" and "next", but at places where it is not particularly described, this does not mean that implementation must be in this order.

As understood by those having ordinary skill in the art, as used in this application, 'section,' 'unit,' 'component,' 'element,' 'module,' 'device,' 'member,' 'mechanism,' 'apparatus,' 'machine,' or 'system' may be implemented as circuitry, such as integrated circuits, application specific circuits ("ASICs"), field programmable logic arrays ("FPLAs"), etc., and/or software implemented on a processor, such as a microprocessor.

The present invention is not limited to these embodiments, and structural elements may be modified in actual implementation within the scope of the gist of the embodiments. It is also possible form various inventions by suitably combining the plurality structural elements disclosed in the above described embodiments. For example, it is possible to omit some of the structural elements shown in the embodiments. It is also possible to suitably combine structural elements from different embodiments.

What is claimed is:

1. An imaging device, comprising:
an image sensor that receives subject light and generates image data; and
a processor comprising a focus control section, an index generating section and a control section, wherein
the focus control section performs focus detection based on the image data, and controls focus drive based on focus detection results;
the index generating section is input with the image data, and generates a first index representing which image of a given plurality of types of image the image data is close to, and a second index representing Bokeh state of an image corresponding to the image data; and
the control section changes control of focus drive by the focus control section based on output of the index generating section.

2. The imaging device of claim 1, wherein:
the index generating section has a first neural network that generates an index representing which of a plurality of image types the image data is, and a second neural network that generates an index representing Bokeh state of an image corresponding to the image data.

3. The imaging device of claim 2, wherein:
the index generating section divides image data into a plurality of image data in accordance with regions of the image, and respective image data that has been divided is input to the first and/or second neural network.

4. The imaging device of claim 1, wherein:
the index generating section has a neural network that includes convolution layers at an initial stage.

5. The imaging device of claim 1, wherein:
the index generating section includes night scene, or periodicity-containing subject scene, or a scene with a mix of near and far objects, or scenes other than these, as a plurality of image classifications.

6. The imaging device of claim 5, wherein:
the focus control section performs correction of an evaluation value generated as a result of focus detection in accordance with brightness, in a case where an index output by the index generating section represents a night scene.

7. The imaging device of claim 5, wherein:
the focus control section performs focus detection by changing focus to a close-up end, in a case where an index output by the index generating section represents the scene with a mix of near and far objects.

8. The imaging device of claim 5, wherein:

in a case where an index that is output by the index generating section represents a night scene, and an index representing Bokeh state represents a larger Bokeh amount than a specified amount, the focus control section makes a threshold value, for determining in focus, larger.

9. The imaging device of claim 2, wherein:

the second neural network of the index generating section has a plurality of neural networks in accordance with image classifications, and generates the second index by selecting the plurality of neural networks based on the first index.

10. The imaging device of claim 2, wherein:

the index generating section divides image data into a plurality of image data in accordance with image region, performs image classification using the first neural network for respective regions and all images, and generates the first index based on the image classification results.

11. The imaging device of claim 1, wherein:

in a case where the first index represents a significant Bokeh state, the focus control section drives the focus lens at a higher speed than normal.

12. A focus adjustment method, comprising:

receiving subject light using an image sensor and generating image data;

inputting the image data, and generating a first index representing which image of a given plurality of types of image the image data is close to, and a second index representing Bokeh state of an image corresponding to the image data; and performing focus detection based on the image data, and, when controlling a focus operation based on focus detection results, changing the focus drive control based on the first index and the second index.

13. The focus adjustment method of claim 12, wherein:

a night scene, or periodicity-containing subject scene, or a scene with a mix of near and far objects, or scenes other than these, are included as the plurality of image classifications.

14. The focus adjustment method of claim 13, wherein:

an evaluation value, generated as a result of focus detection, is corrected in accordance with brightness, in a case where the first index represents the night scene.

15. The focus adjustment method of claim 13, wherein:

when the first index represents a scene with a mix of near and far objects, focus detection is performed by changing focus to a close-up end.

16. The focus adjustment method of claim 13, wherein:

when the first index represents the night scene, and the second index represents a Bokeh amount that is larger than a specified amount, a threshold value for determining focus is made higher.

17. A non-transitory computer-readable medium storing a processor executable code, which when executed by at least one processor, performs a focus adjusting method, the focus adjusting method comprising:

receiving subject light using an image sensor and generating image data;

inputting the image data, and generating a first index representing which image of a given plurality of types of image the image data is close to, and a second index representing Bokeh state of an image corresponding to the image data; and performing focus detection based on the image data, and, when controlling a focus operation based on focus detection results, changing the focus drive control based on the first index and the second index.

18. The non-transitory computer-readable medium of claim 17, wherein:

a night scene, or periodicity-containing subject scene, or a scene with a mix of near and far objects, or scenes other than these, are included as the plurality of image classifications.

19. The non-transitory computer-readable medium of claim 18, wherein:

an evaluation value, generated as a result of focus detection, is corrected in accordance with brightness, in a case where the first index represents the night scene.

20. The non-transitory computer-readable medium of claim 18, wherein:

when the first index represents the scene with a mix of near and far objects, focus detection is performed by changing focus to a close-up end.

* * * * *